United States Patent [19]
Hayashi et al.

[11] Patent Number: 6,002,519
[45] Date of Patent: *Dec. 14, 1999

[54] TAKING OPTICAL SYSTEM HAVING A HAND-SHAKE CORRECTION FUNCTION

[75] Inventors: Kohtaro Hayashi, Toyonaka; Shigeto Ohmori, Kawachinagano, both of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/823,963

[22] Filed: Mar. 25, 1997

[30] Foreign Application Priority Data

Mar. 29, 1996 [JP] Japan ................... 8-075725

[51] Int. Cl.$^6$ ................... G02B 27/64
[52] U.S. Cl. ................ 359/557; 359/554; 359/558
[58] Field of Search ................... 359/554–558, 359/563–571, 676–677, 686; 396/52–55; 348/208

[56] References Cited

U.S. PATENT DOCUMENTS

| | | |
|---|---|---|
| 4,998,809 | 3/1991 | Tsuji et al. ................... 359/557 |
| 5,040,881 | 8/1991 | Tsuji ................... 359/557 |
| 5,121,978 | 6/1992 | Maruyama ................... 359/557 |
| 5,168,403 | 12/1992 | Umeda et al. ................... 359/557 |
| 5,268,790 | 12/1993 | Chen ................... 359/565 |

FOREIGN PATENT DOCUMENTS

| | | |
|---|---|---|
| 5224160 | 9/1993 | Japan . |
| 5232410 | 9/1993 | Japan . |
| 6230446 | 8/1994 | Japan . |
| 6337375 | 12/1994 | Japan . |

*Primary Examiner*—Thong Nguyen
*Attorney, Agent, or Firm*—Price, Gess & Ubell

[57] ABSTRACT

A taking optical system capable of correcting an image blur resulting from vibration of the optical system consists of a first positive lens unit, a second negative lens unit, a third positive lens unit, and a fourth negative lens unit, and achieves zooming by varying distances between these lens units. The second lens unit includes a decentered lens element, which has a diffracting optical surface formed on its image-side surface, so that an image blur is corrected by decentering the decentered lens element translationally.

32 Claims, 28 Drawing Sheets

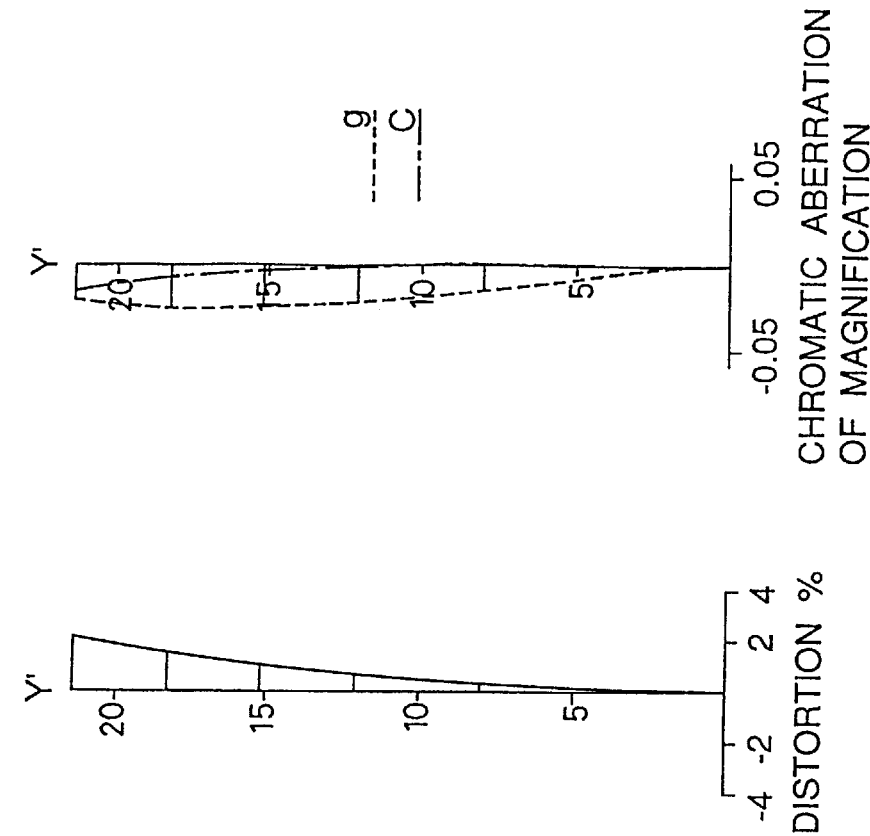
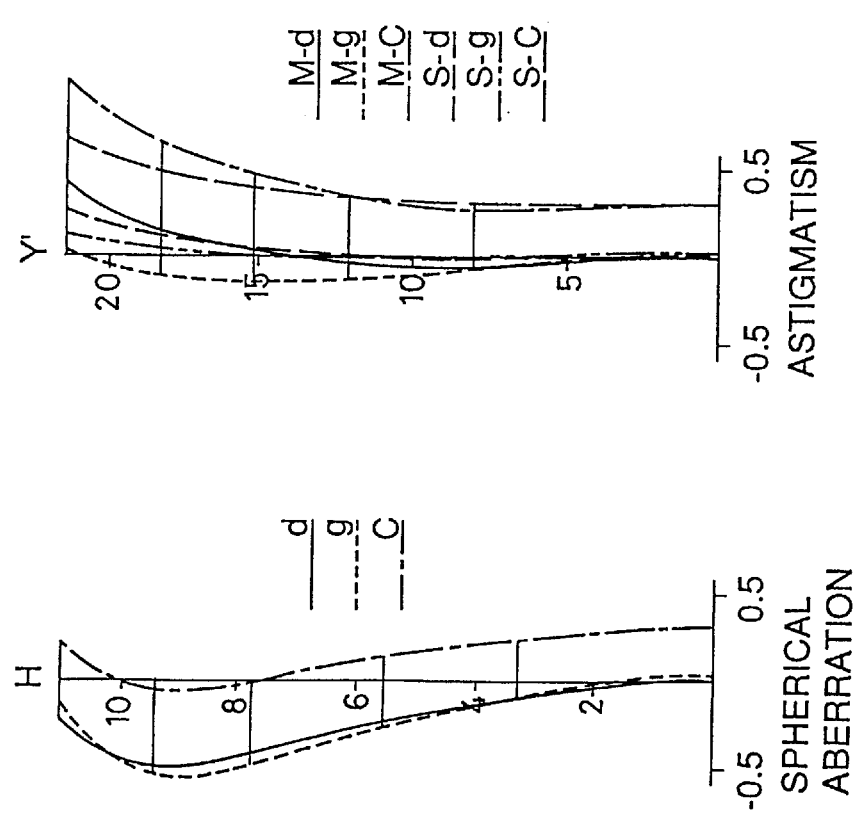

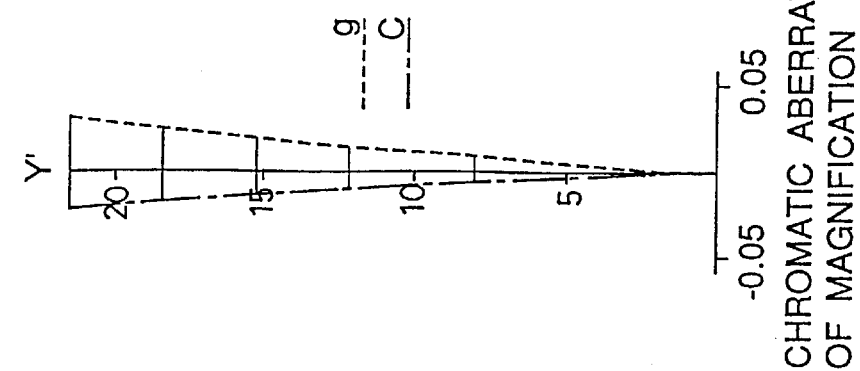
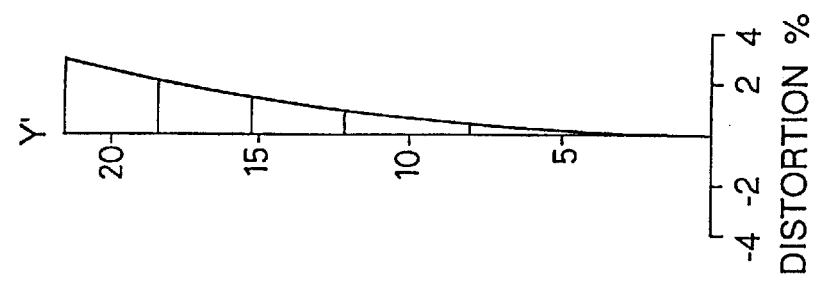
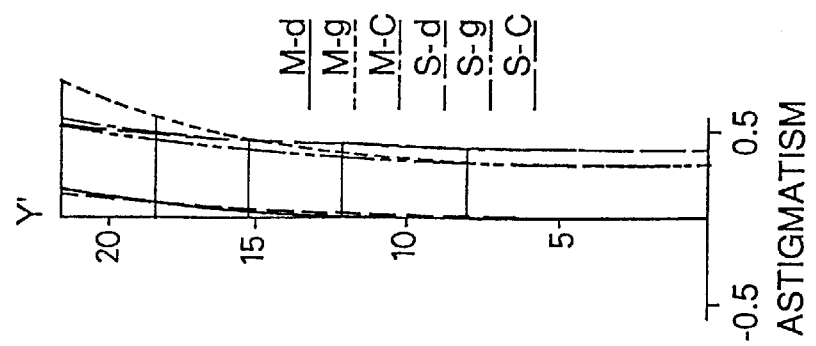
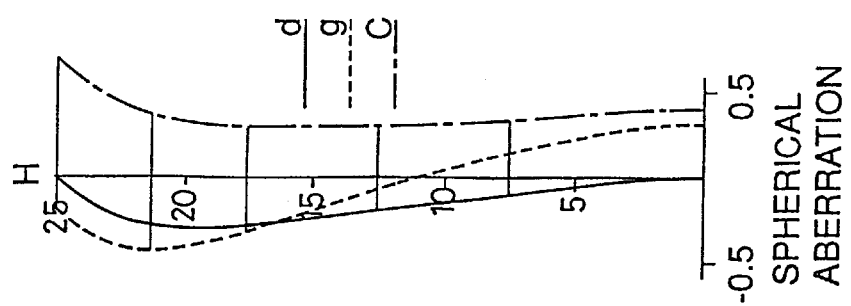

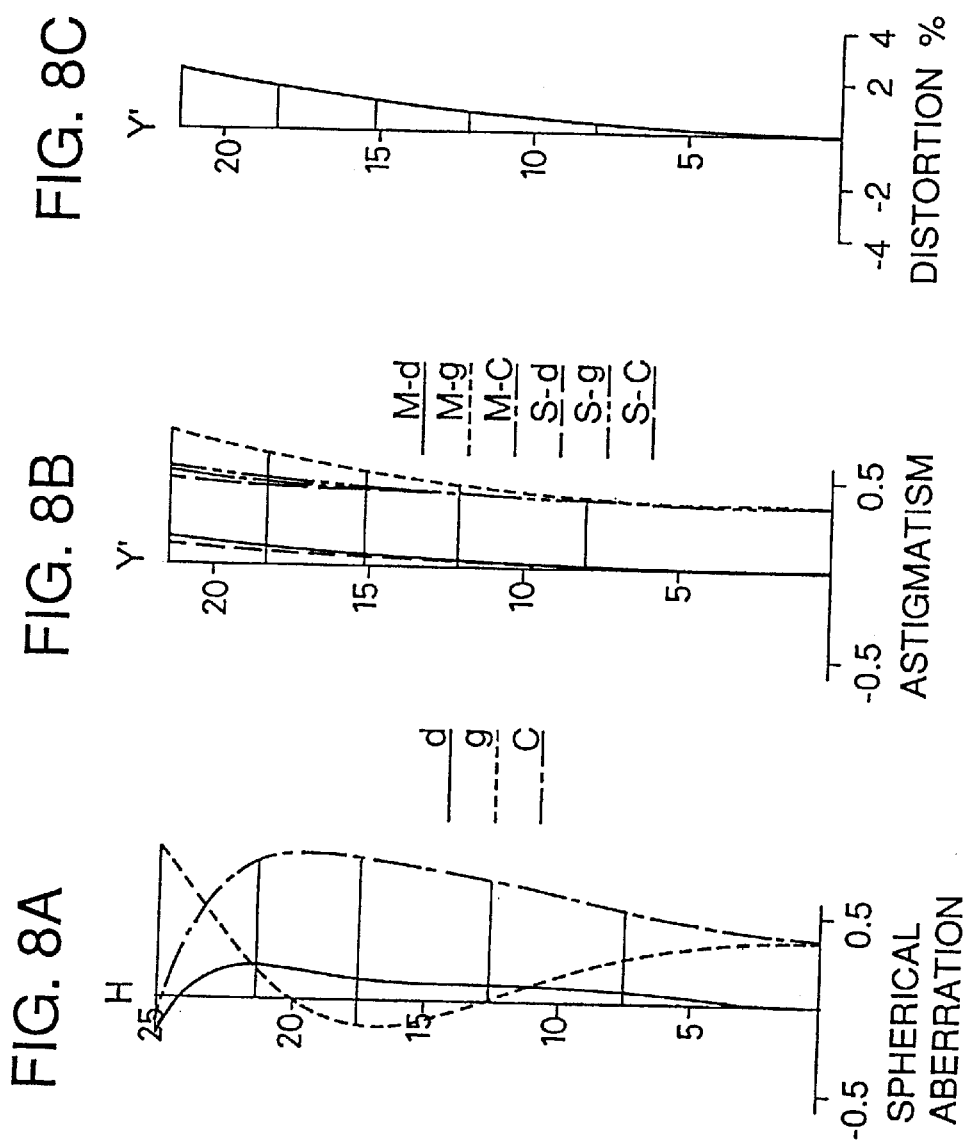

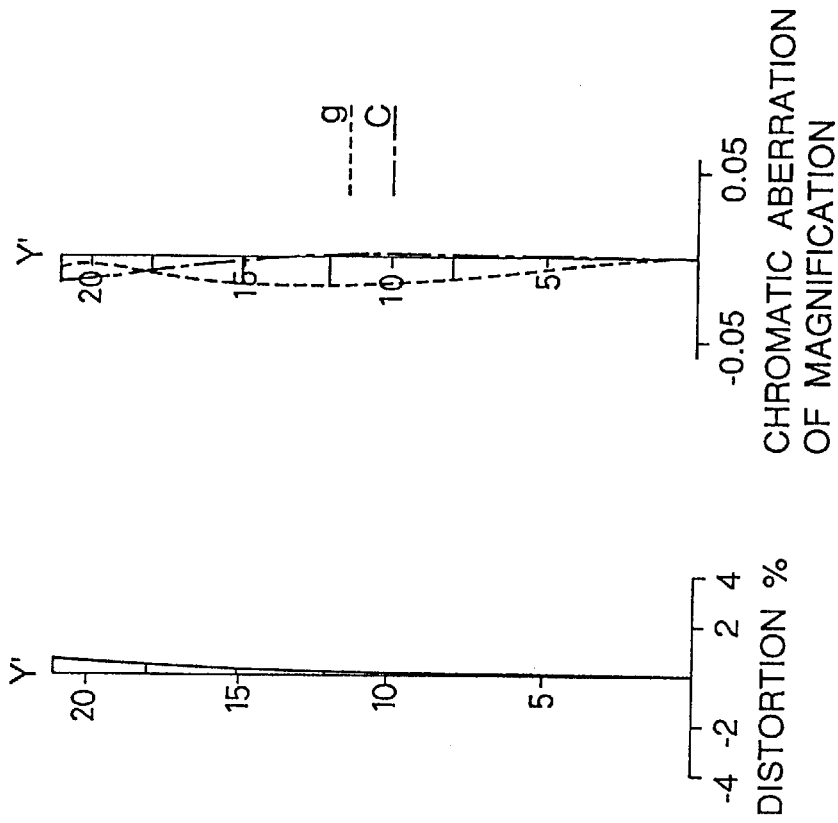
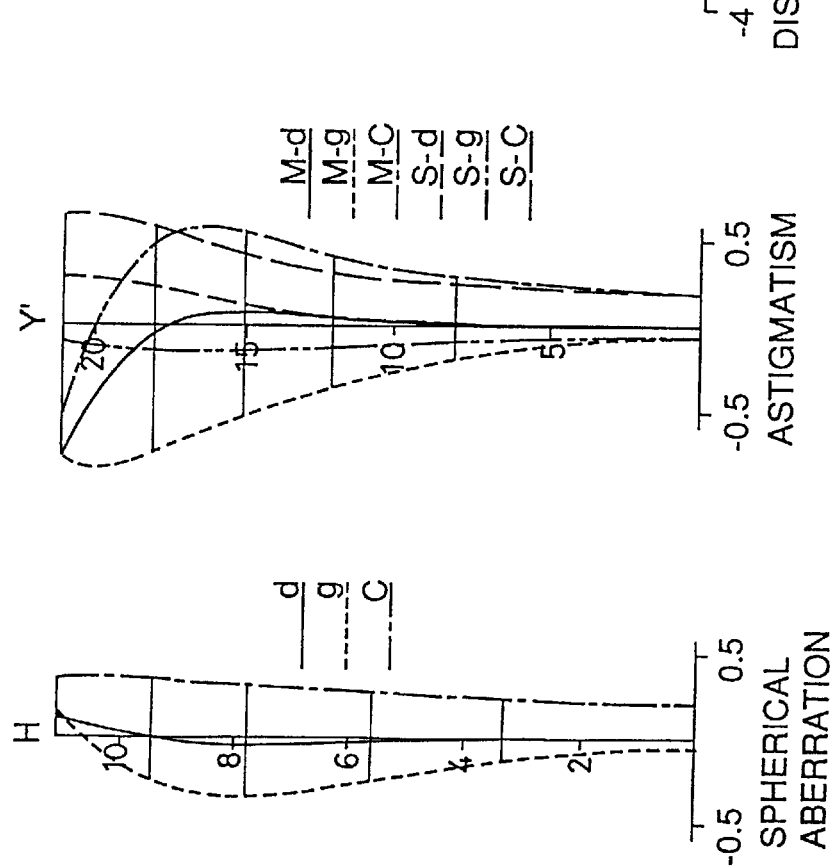

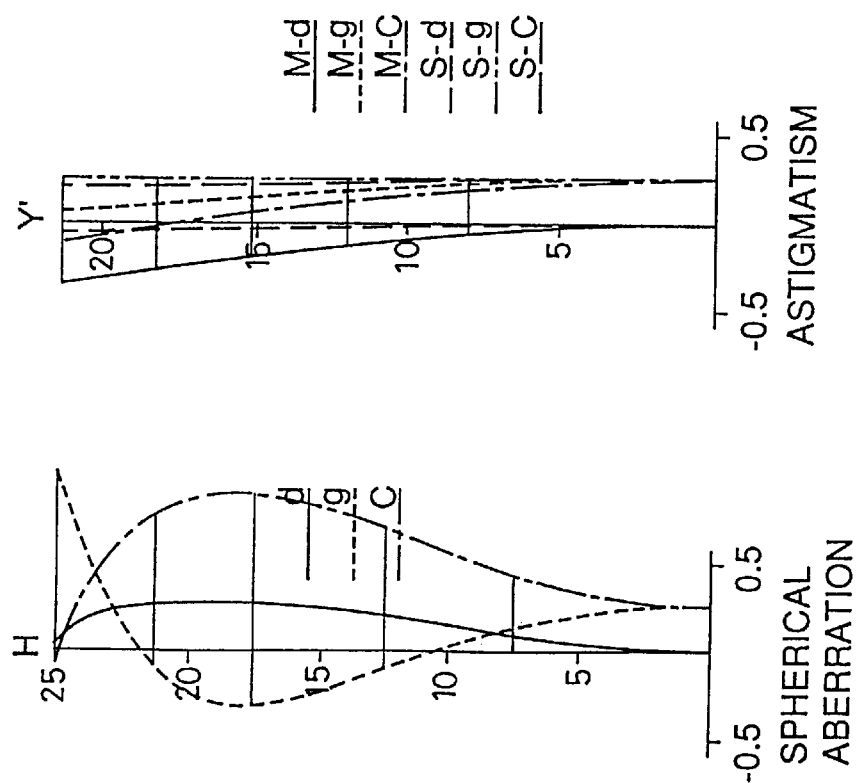
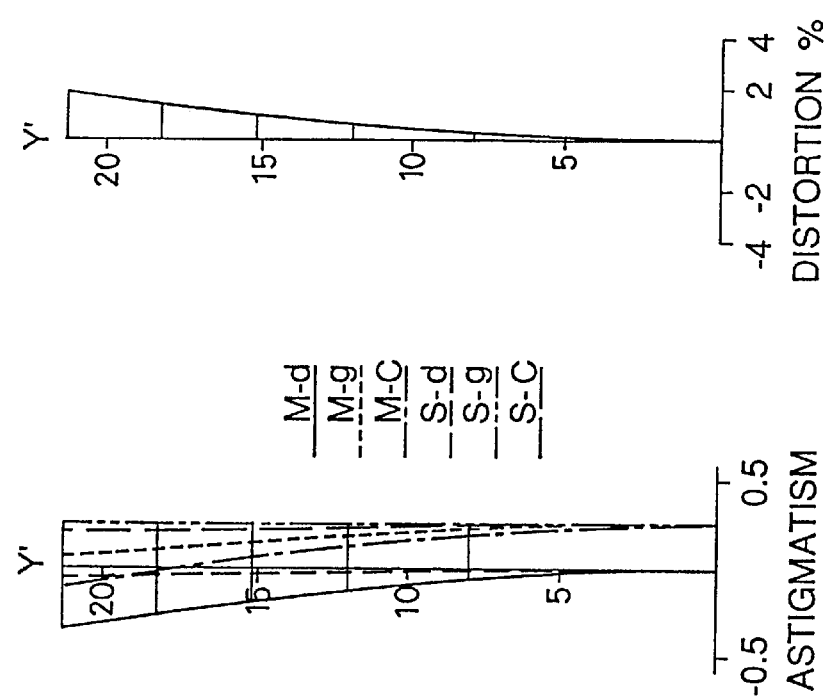
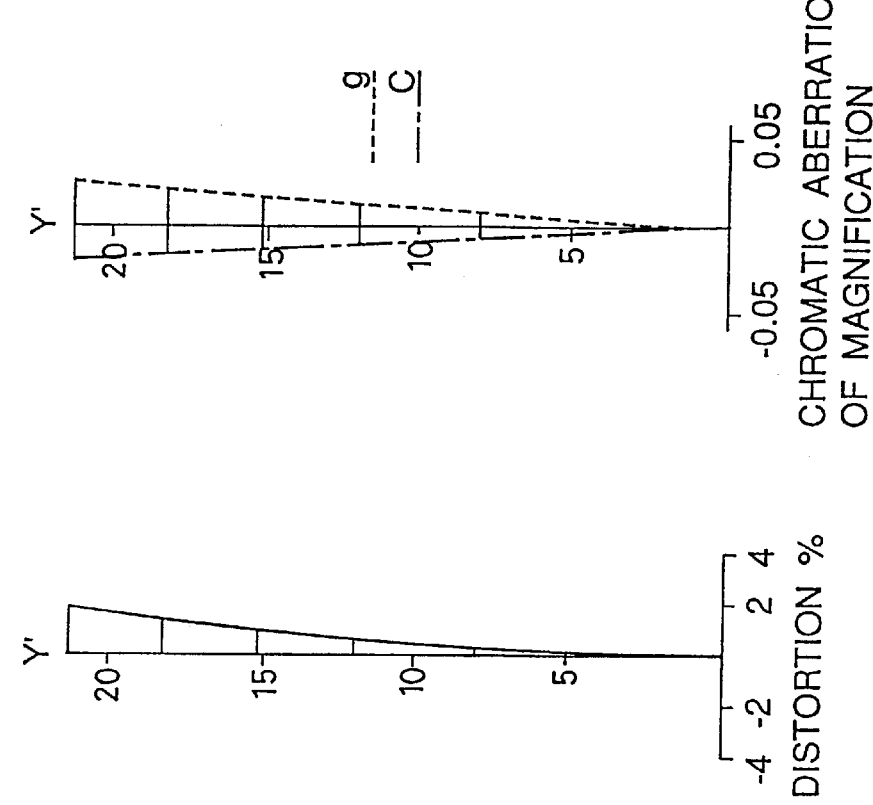
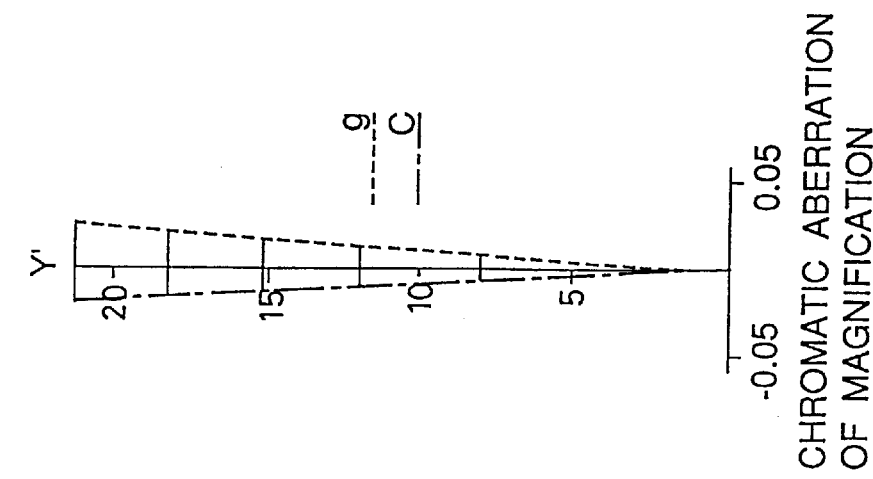

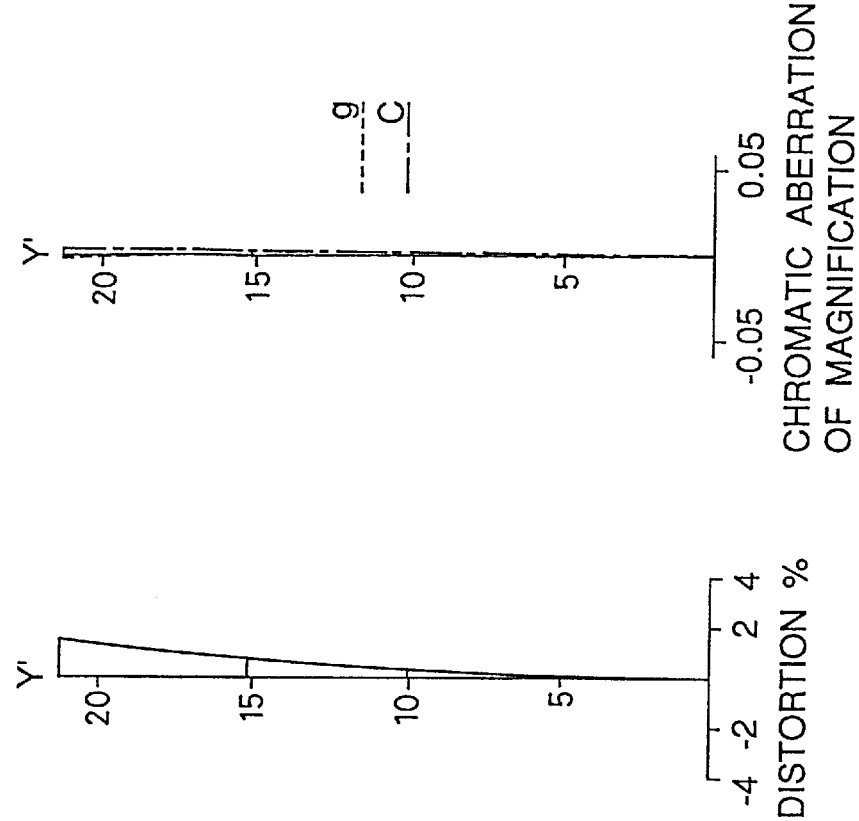

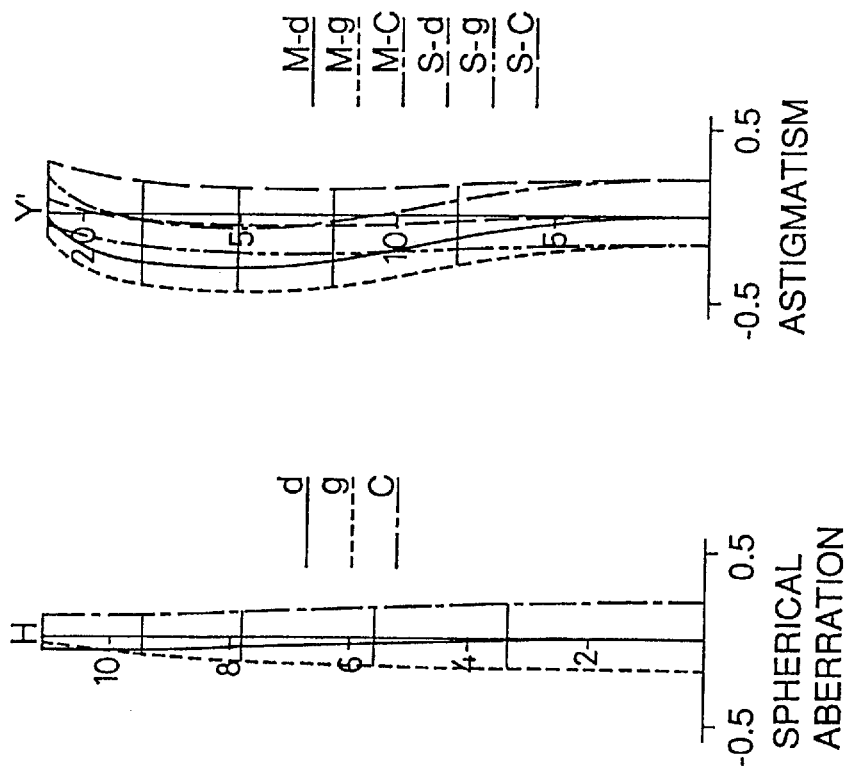
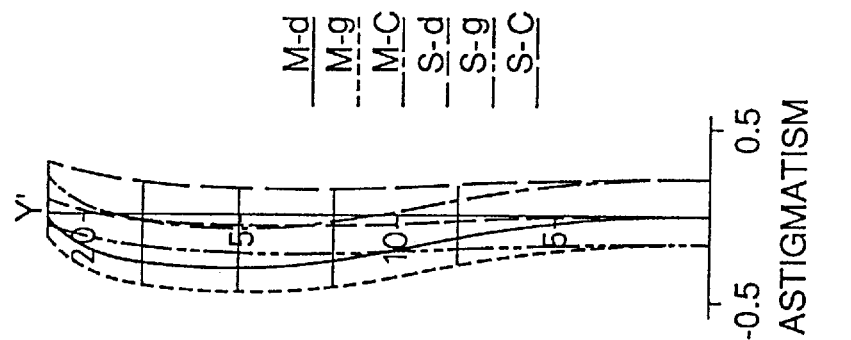
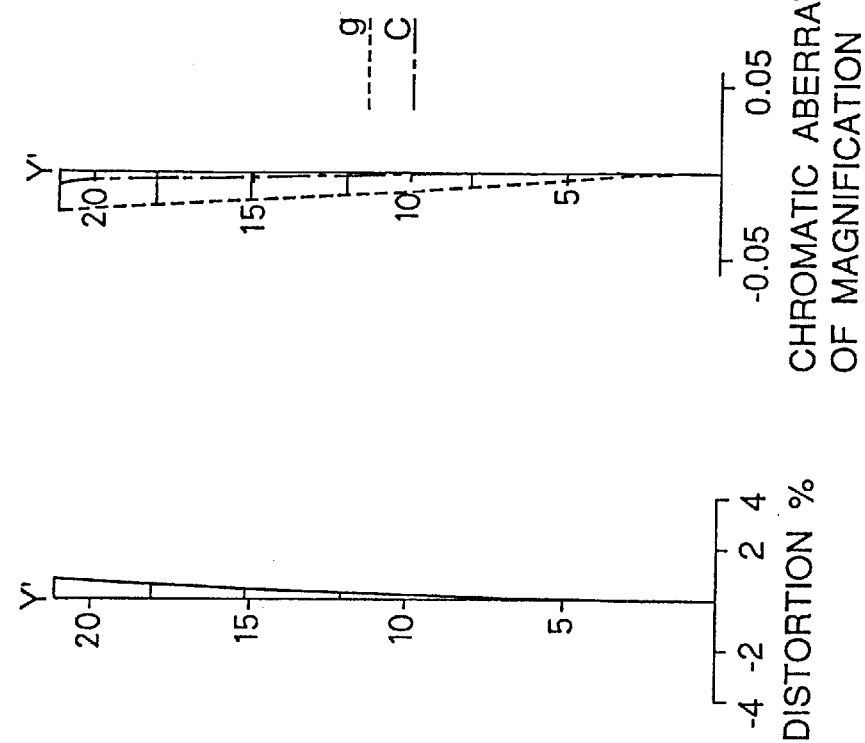
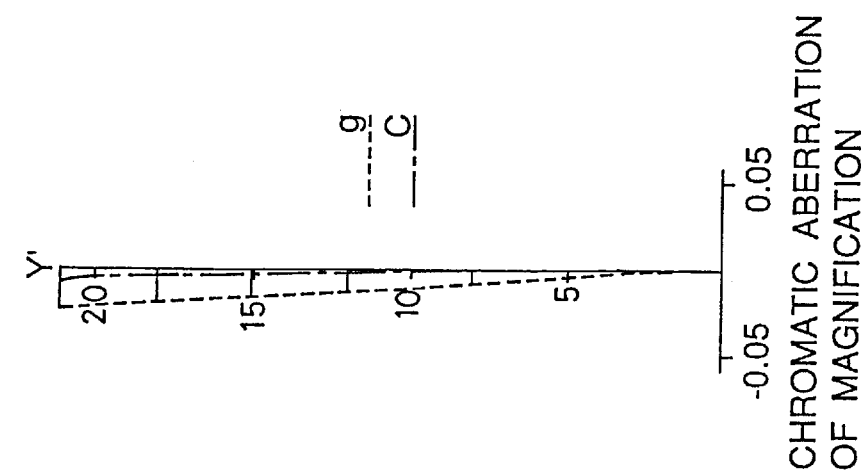

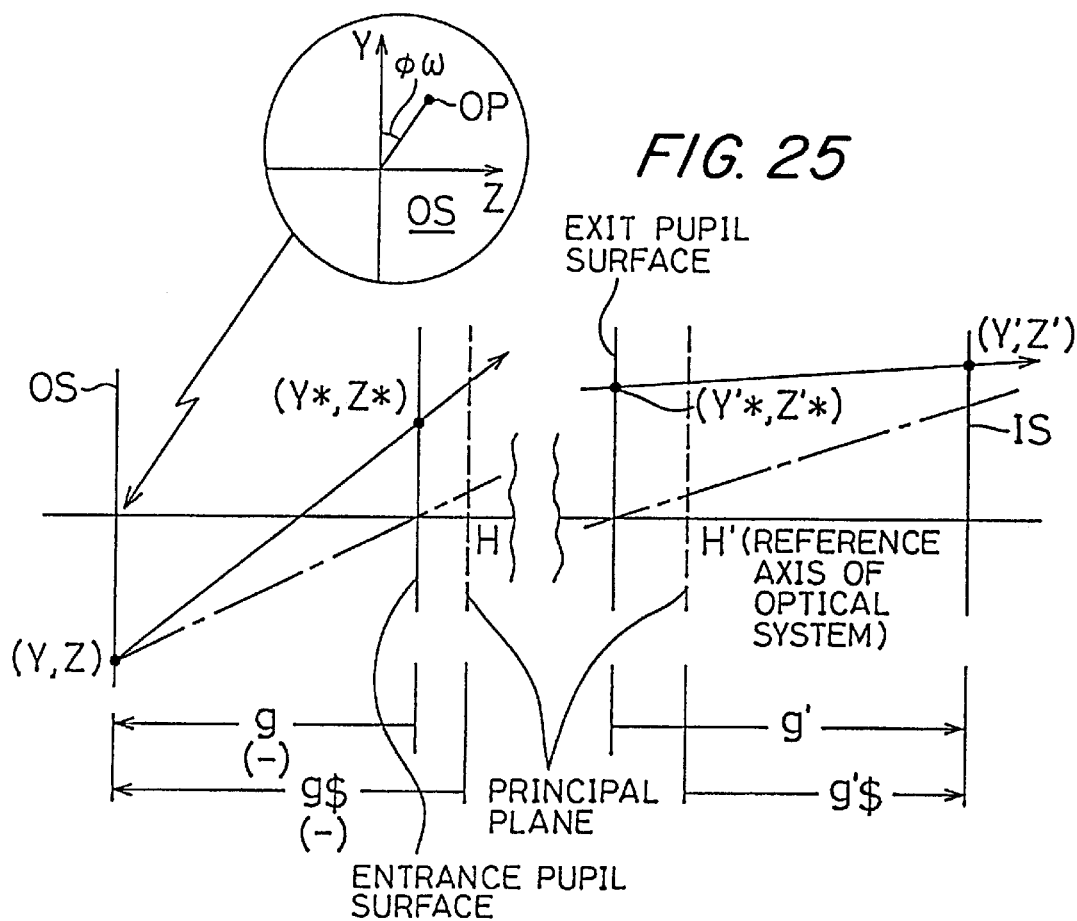

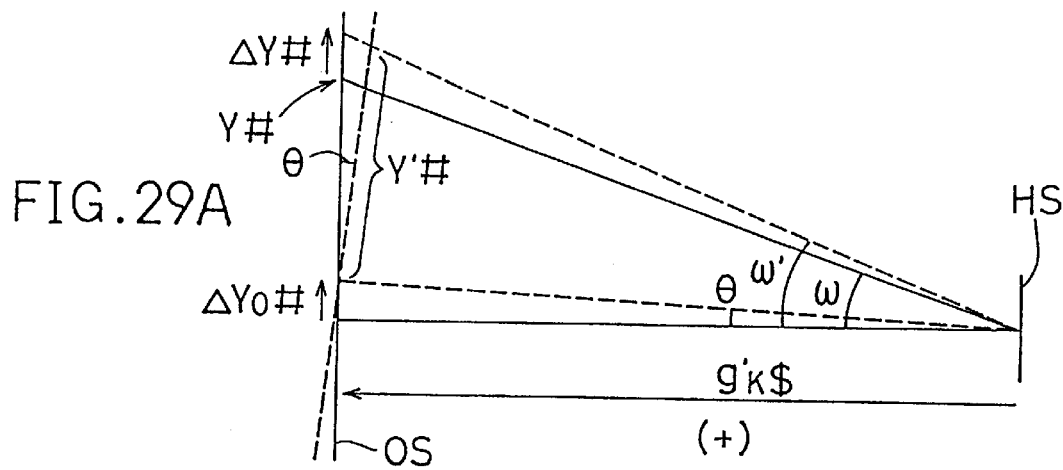
FIG.29A
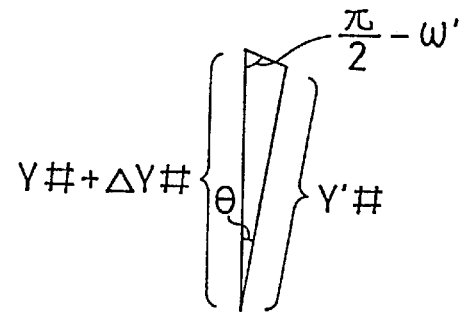
FIG.29B
FIG.30
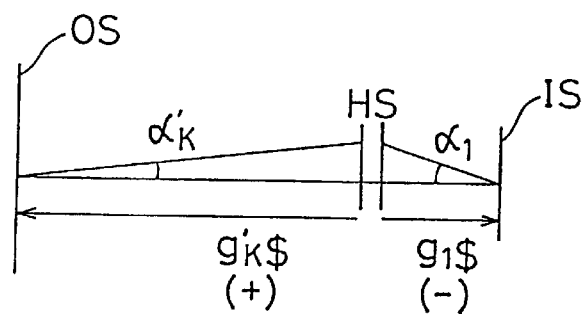

TAKING OPTICAL SYSTEM HAVING A HAND-SHAKE CORRECTION FUNCTION

BACKGROUND OF THE INVENTION

1. Field of the Invention

The present invention relates to a taking optical system having a hand-shake correction function. More particularly, the present invention relates to a taking optical system that has a hand-shake correction function for reducing an image blur such as resulting from a hand shake or other vibration of a camera that may occur when shooting is performed with the camera held by hand, and that is suitable especially for use as a telephoto-oriented zoom lens system.

2. Description of the Prior Art

Conventionally, in a taking optical system having a hand-shake correction function, an image blur such as resulting from a hand shake or other vibration of the optical system is corrected either by the use of part of the lens elements constituting the taking optical system or by the use of an optical element other than lens elements that is provided in the taking optical system. In either case, it is essential that a taking optical system having a hand-shake correction function offer satisfactory optical performance not only in a normal state, in which hand-shake correction is not functioning, but also in a hand-shake correction state, in which hand-shake correction is functioning.

The former hand-shake correction method is adopted, for example, in the telephoto-oriented zoom lens systems having a hand-shake correction function which are proposed in Japanese Laid-open Patent Applications Nos. H5-232410, H5-224160, and H6-337375. In these zoom lens systems, hand-shake correction is achieved by decentering one of the zoom lens units constituting the zoom lens system or by decentering part of the lens elements constituting the zoom lens units in a direction perpendicular to the optical axis. Specifically, in the zoom lens systems proposed in Japanese Laid-open Patent Applications Nos. H5-232410 and H5-224160, a lens unit that is composed of more or less three lens elements is decentered for hand-shake correction in order to minimize aberrations that occur when the lens unit is decentered; in the zoom lens system proposed in Japanese Laid-open Patent Application No. H6-337375, a lens element that is composed of a doublet lens element is decentered for hand-shake correction in order to minimize chromatic aberrations that occur when the lens element is decentered.

The latter hand-shake correction method is adopted, for example, in the taking optical system having a hand-shake correction function which is proposed in Japanese Laid-open Patent Application No. H6-230446. In this taking optical system, an optical element, such as a prism, that acts as an optical wedge is disposed at the front or rear end of the taking optical system so that hand-shake correction is achieved through the wedge effect that is caused by such an optical element. Specifically, in the taking optical system proposed in Japanese Laid-open Patent Application No. H6-230446, two wedge prisms having diffracting optical surfaces are disposed at the rear end of the taking optical system so that axial lateral chromatic aberrations are suppressed by these diffracting optical surfaces.

However, in taking optical systems having a hand-shake correction function which adopt the former hand-shake correction method, since hand-shake correction is achieved by decentering part of the constituent lens elements, it is difficult to maintain satisfactory optical performance when those lens elements are decentered. In particular, in zoom lens systems, which need to offer satisfactory optical performance over the entire zoom range, it is extremely difficult to maintain satisfactory optical performance over the entire zoom range from the wide-angle end to the telephoto end when part of the constituent lens elements are decentered.

Specifically, in a construction such as those of the above-mentioned telephoto-oriented zoom lens systems proposed in Japanese Laid-open Patent Applications Nos. H5-232410 and H5-224160, where hand-shake correction is achieved by decentering a plurality of lens elements, the greater the number of lens elements included in the decentered lens unit, the larger and heavier that lens unit becomes. This is undesirable because, although decentering of the lens unit needs to be performed in real time as soon as an instantaneous image blur (such as resulting from a hand shake or other vibration of the optical system) is detected, it is difficult to decenter a large and heavy lens unit quickly enough, and also because it is necessary to use a drive system having accordingly large power.

Moreover, even in a construction such as that of the above-mentioned telephoto-oriented zoom lens system proposed in Japanese Laid-open Patent Applications No. H6-337375, where hand-shake correction is achieved by decentering a doublet lens element, it is inevitable that the decentered doublet lens element has approximately double the axial thickness of a single lens element. This is undesirable because it is difficult to decenter such a lens element quickly enough, and also because it is necessary to use a drive system having accordingly large power. Furthermore, in a construction of this type, where the number of decentered lens elements is reduced to a minimum, it is necessary to weaken the power of the decentered lens element in order to obtain satisfactory optical performance during hand-shake correction. Weakening of the power of the decentered lens element leads to an increase in the decentering amount by which the lens element needs to be decentered for a unit hand-shake angle. This means that the lens element needs to be decentered more quickly, and accordingly that its drive system needs to bear an increased load.

On the other hand, in taking optical systems having a hand-shake correction function which adopt the latter hand-shake correction method, it is necessary to secure a space for disposing a prism at the front or rear end of the taking optical system, and therefore it is inevitable that the taking optical system as a whole becomes accordingly larger. For example, in the above-mentioned taking optical system proposed in Japanese Laid-open Patent Application No. H6-230446, it is necessary to secure a space for disposing two prisms at the rear end of the taking optical system. This makes the taking optical system as a whole larger by the extra space secured for the prisms. Moreover, in a taking optical system of this type, it is necessary to use two such hand-shake correction blocks to correct an image blur properly, because, in general, an image blur needs to be corrected in at least two directions. Such a construction, however, is impractical.

SUMMARY OF THE INVENTION

An object of the present invention is to provide a taking optical system having a hand-shake correction function that achieves hand-shake correction by decentering a very light optical element, that is capable of correcting aberrations properly both in the normal state and in the hand-shake correction state, and that is as compact as a taking optical system having no hand-shake correction function.

To achieve the above object, according to the present invention, a taking optical system having a hand-shake correction function that achieves hand-shake correction by decentering part of the lens elements constituting the taking optical system is characterized in that at least one diffracting optical surface is formed on the lens element that is decentered for hand-shake correction.

It is preferable that the above-mentioned decentered lens element be realized as a single lens element, and further that the single lens element satisfy conditions (1) and (2) below. Moreover, it is preferable that the decentered lens element be realized as a plastic lens element, and further that it include at least one aspherical surface.

$$0.005 < \phi d/\phi r < 0.10 \qquad (1)$$

$$\nu dr > 50 \qquad (2)$$

where $\phi d$: power of the diffracting optical surface;

$\phi r$: composite power of the refracting optical surfaces of the lens element having the diffracting optical surface;

$\nu dr$: Abbe number of the lens element having the diffracting optical surface.

If the lower limit of condition (1) is exceeded, the power of the diffracting optical surface is too weak, with the result that so large axial lateral chromatic aberrations occur that it is not possible to correct them satisfactorily with a single lens element. By contrast, if the upper limit of condition (1) is exceeded, the diffracting optical surface overcorrects chromatic aberrations, with the result that axial lateral chromatic aberrations occur in the reverse direction. Even if condition (1) is satisfied, unless condition (2) is satisfied, it is not possible to keep desirable distribution of chromatic aberrations between the longer-wavelength side and the shorter-wavelength side of a predetermined reference wavelength.

BRIEF DESCRIPTION OF THE DRAWINGS

This and other objects and features of this invention will become clear from the following description, taken in conjunction with the preferred embodiments with reference to the accompanied drawings in which:

FIGS. 2A to 2D are aberration diagrams showing aberrations observed in the first embodiment, at the wide-angle end, before decentering;

FIGS. 3A to 3D are aberration diagrams showing aberrations observed in the first embodiment, at the telephoto end, before decentering;

FIGS. 8A to 8D are aberration diagrams showing aberrations observed in the second embodiment, at the telephoto end, before decentering;

FIGS. 12A to 12D are aberration diagrams showing aberrations observed in the third embodiment, at the wide-angle end, before decentering;

FIGS. 13A to 13D are aberration diagrams showing aberrations observed in the third embodiment, at the telephoto end, before decentering;

FIGS. 17A to 17D are aberration diagrams showing aberrations observed in the fourth embodiment, before decentering;

FIGS. 20A to 20D are aberration diagrams showing aberrations observed in the fifth embodiment, at the wide-angle end, before decentering;

FIG. 25 is a diagram illustrating the relationship between an optical system and a coordinate system;

FIGS. 29A and 29B are diagrams illustrating the rotational conversion; and

FIG. 30 is a diagram illustrating the use of the image plane in place of the object plane.

DESCRIPTION OF THE PREFERRED EMBODIMENTS

Figure 1:
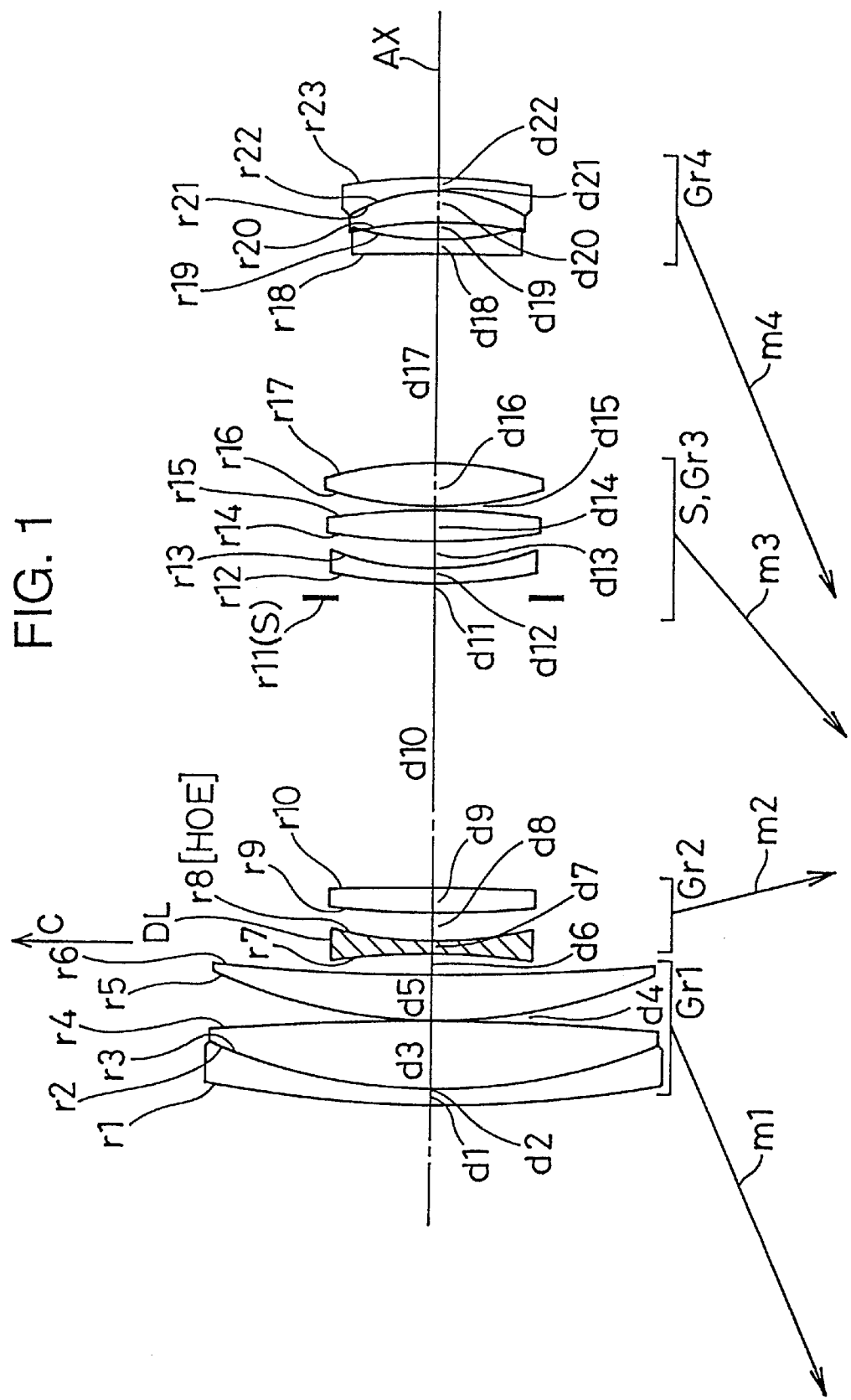
FIG. 1 is a lens construction diagram of the first embodiment of the present invention.
Figure 4A:
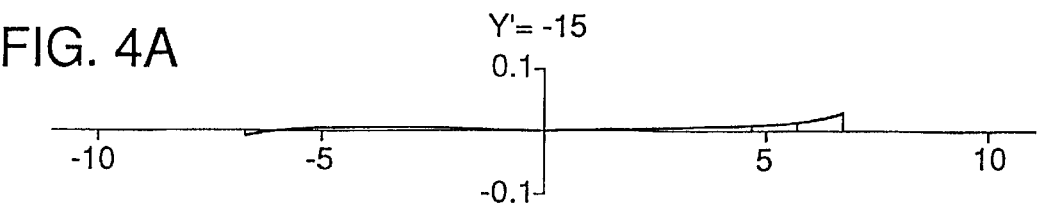
FIGS. 4A to 4F are aberration diagrams showing meridional lateral aberrations observed in the first embodiment, at the wide-angle end, before and after decentering.
Figure 4B:
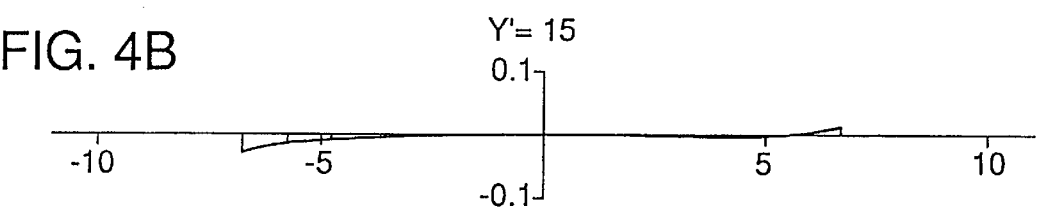
Figure 4C:
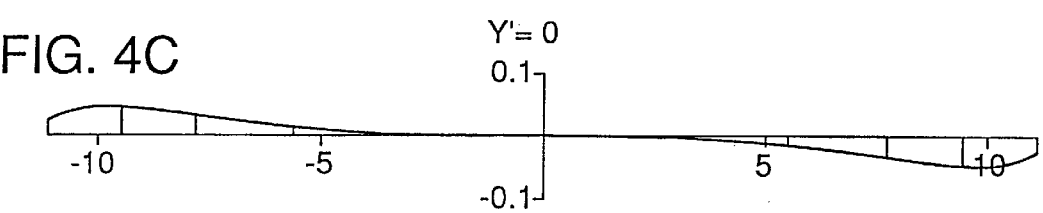
Figure 4D:
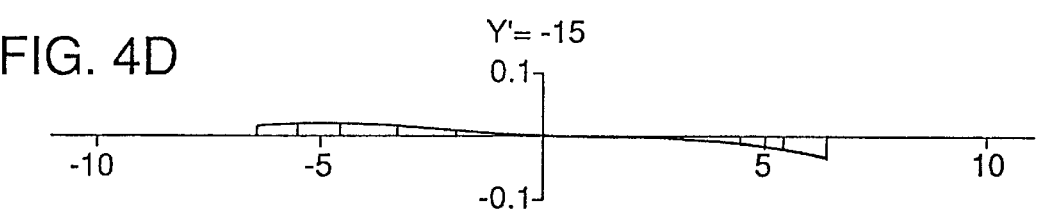
Figure 4E:
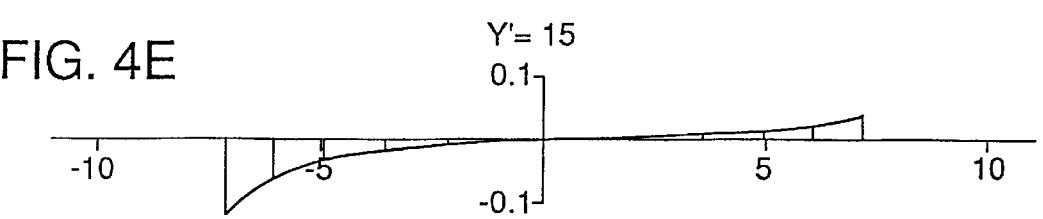
Figure 4F:
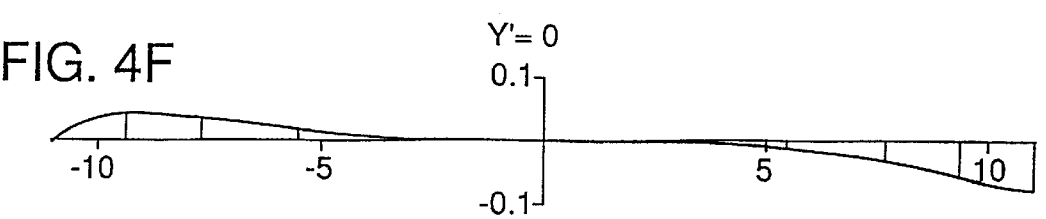
Figure 5A:
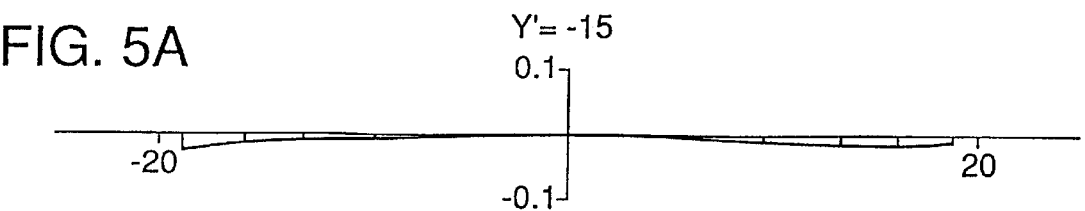
FIGS. 5A to 5F are aberration diagrams showing meridional lateral aberrations observed in the first embodiment, at the telephoto end, before and after decentering.
Figure 5B:
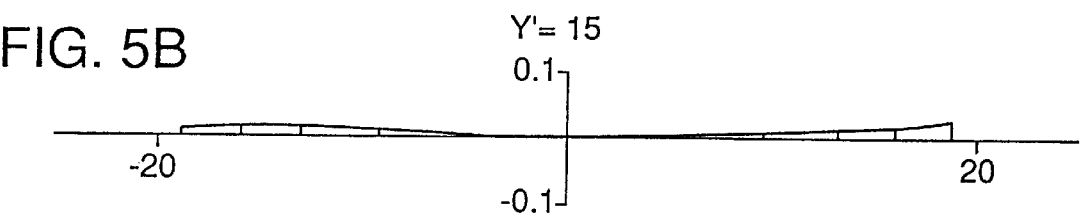
Figure 5C:
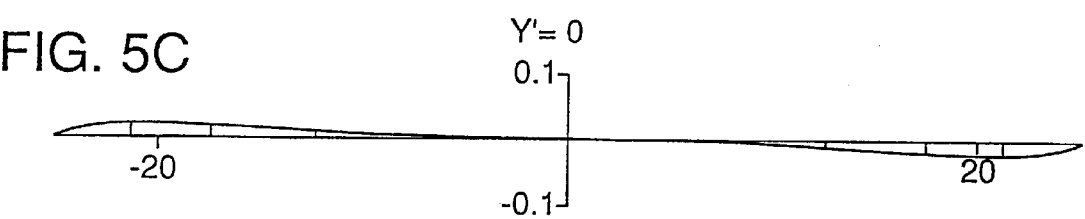
Figure 5D:
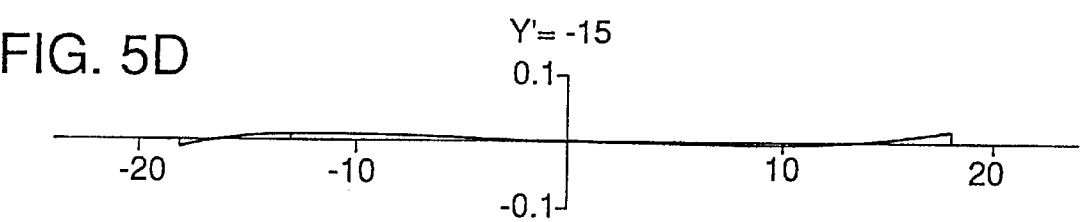
Figure 5E:
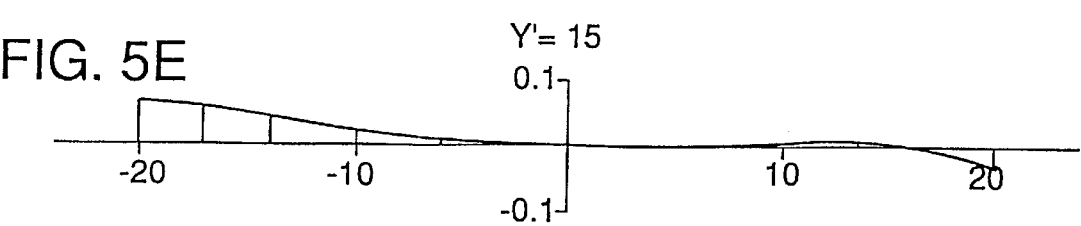
Figure 5F:
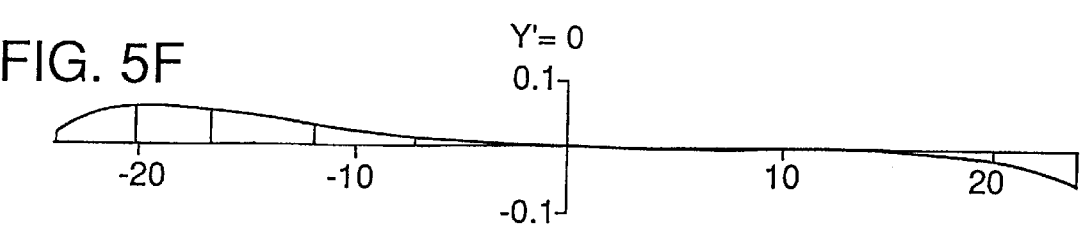
Figure 6:
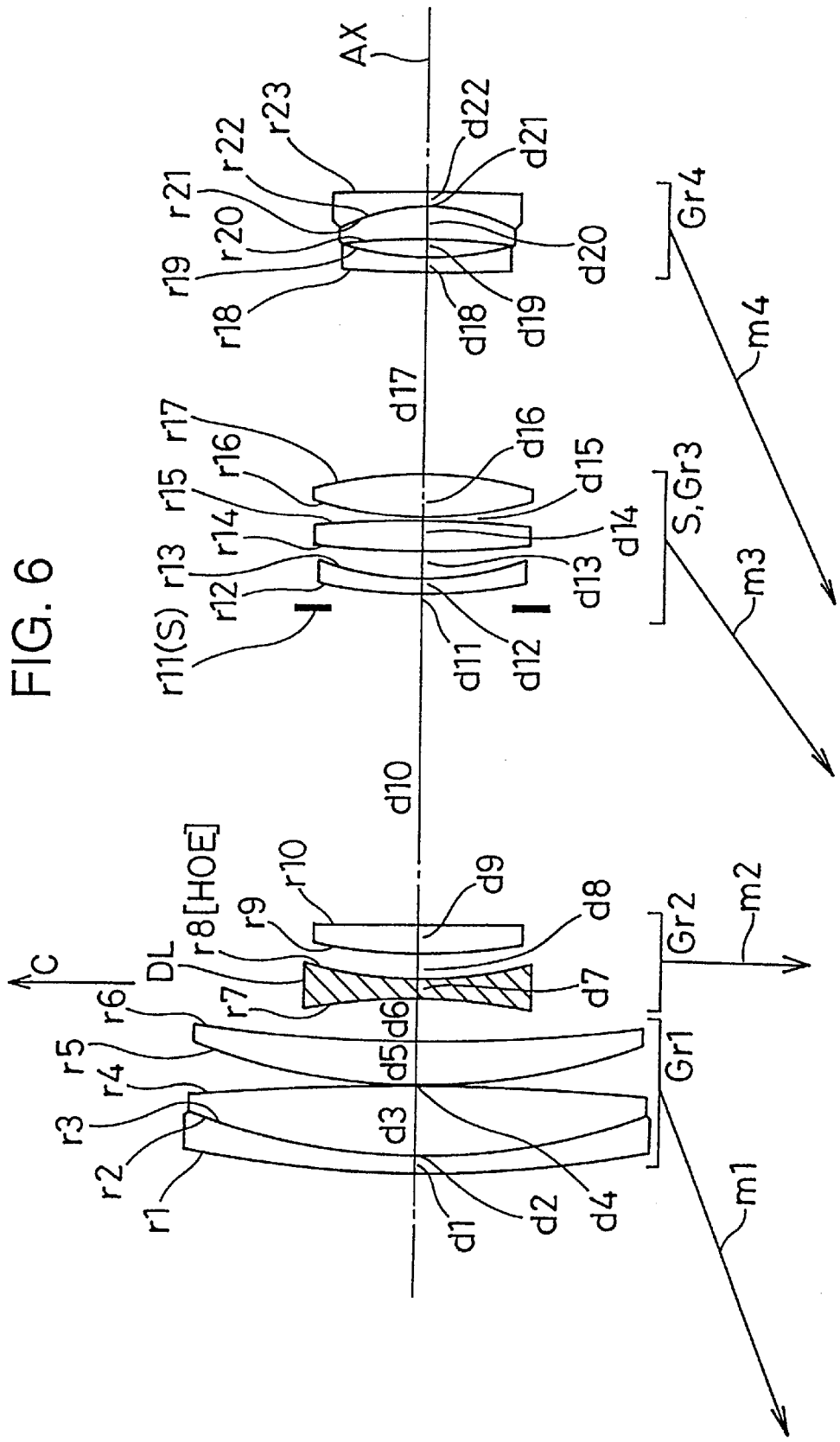
FIG. 6 is a lens construction diagram of the second embodiment of the present invention.
Figure 7A:
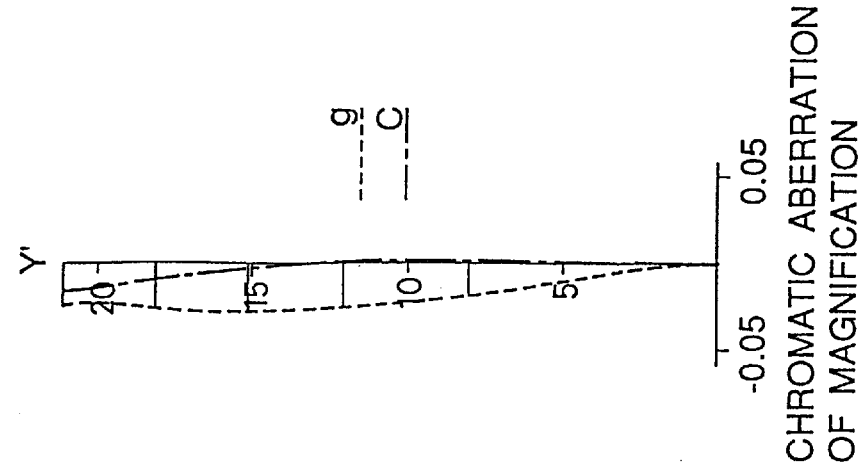
FIGS. 7A to 7D are aberration diagrams showing aberrations observed in the second embodiment, at the wide-angle end, before decentering.
Figure 7B:
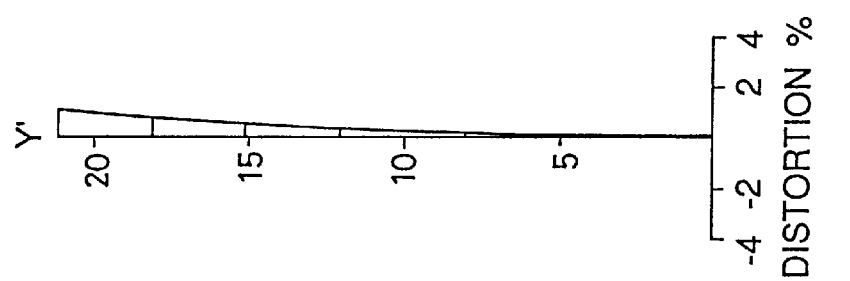
Figure 7C:
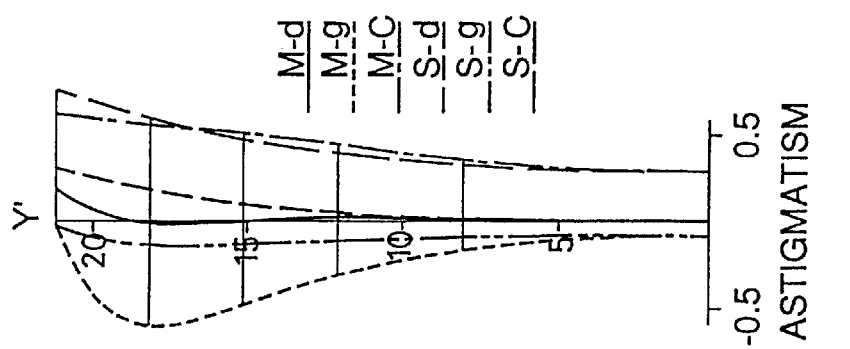
Figure 7D:
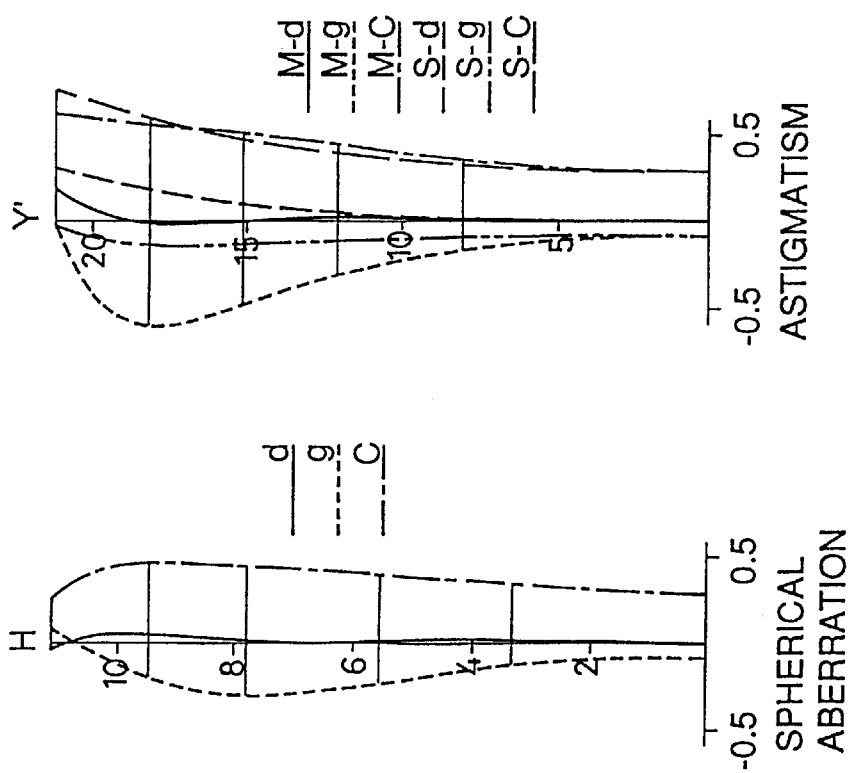
Figure 9A:
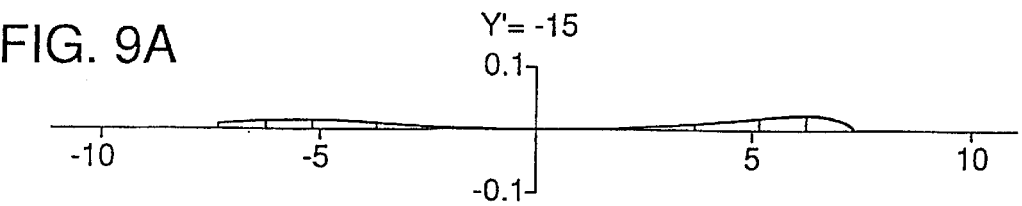
FIGS. 9A to 9F are aberration diagrams showing meridional lateral aberrations observed in the second embodiment, at the wide-angle end, before and after decentering.
Figure 9B:
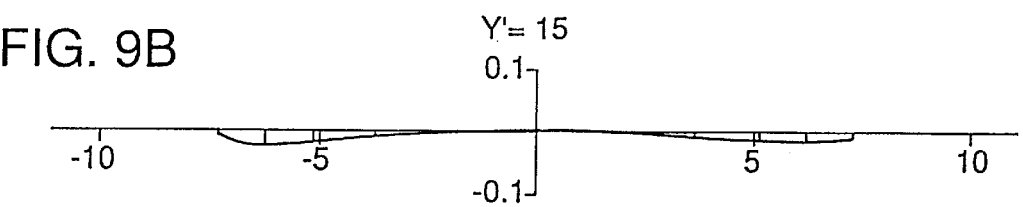
Figure 9C:
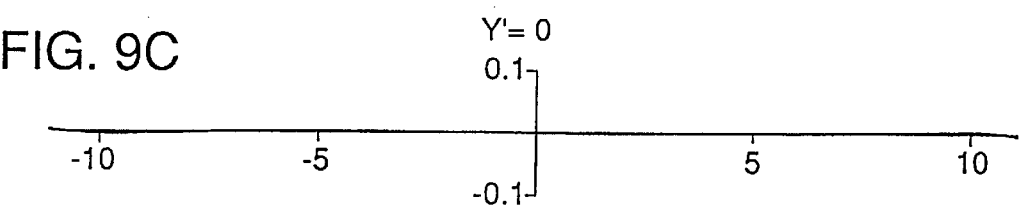
Figure 9D:
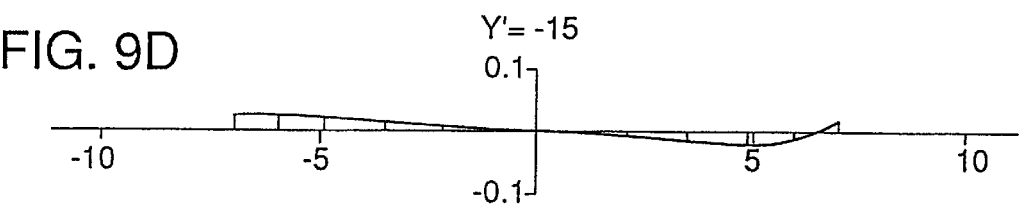
Figure 9E:
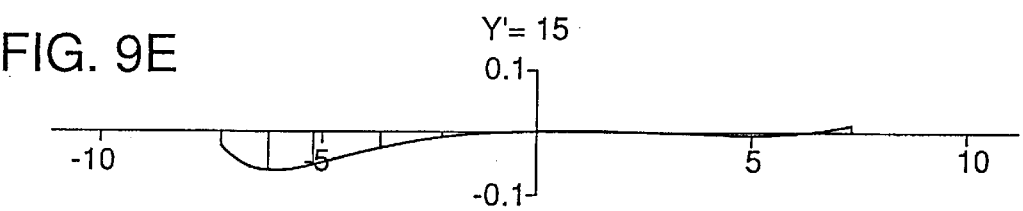
Figure 9F:
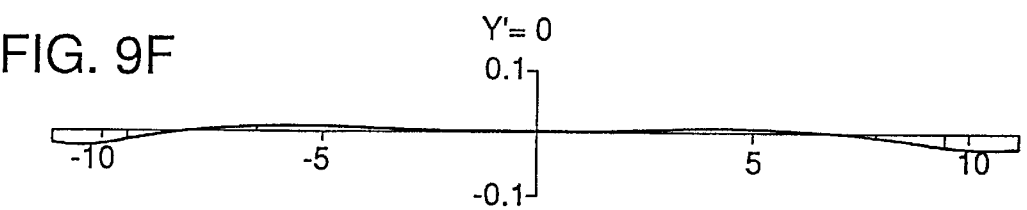
Figure 10A:
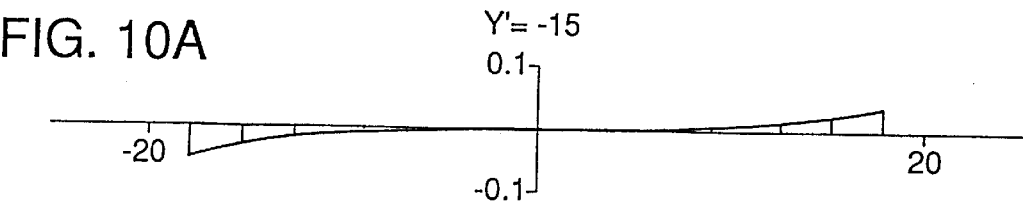
FIGS. 10A to 10F are aberration diagrams showing meridional lateral aberrations observed in the second embodiment, at the telephoto end, before and after decentering.
Figure 10B:
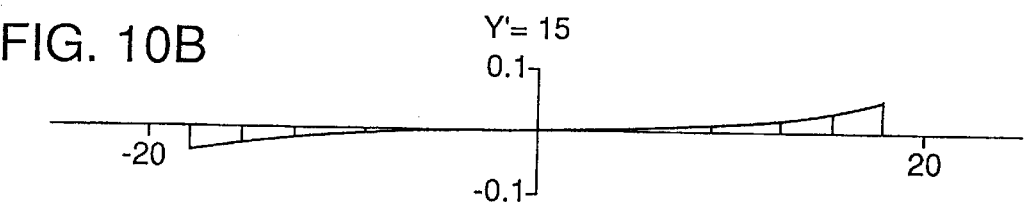
Figure 10C:
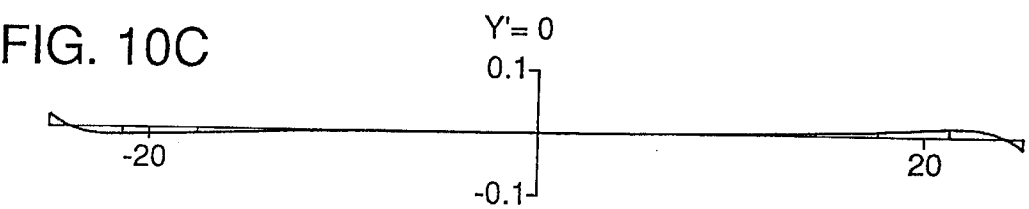
Figure 10D:
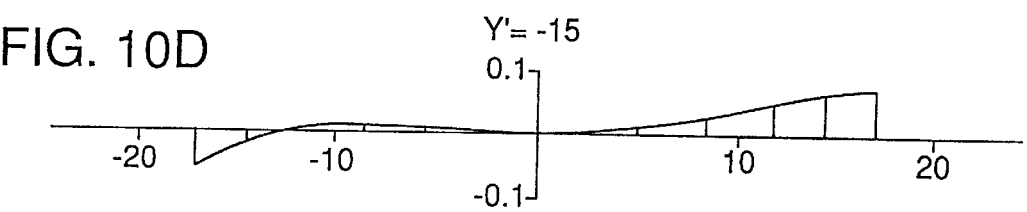
Figure 10E:
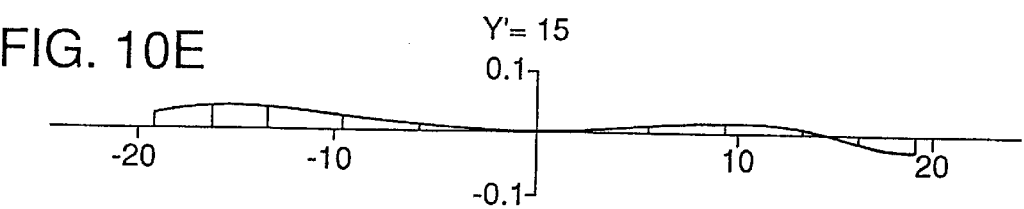
Figure 10:
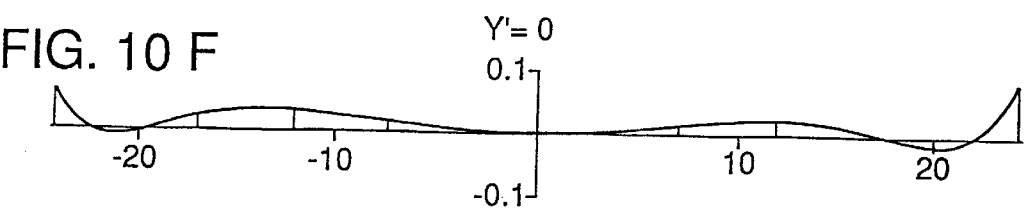
Figure 11:
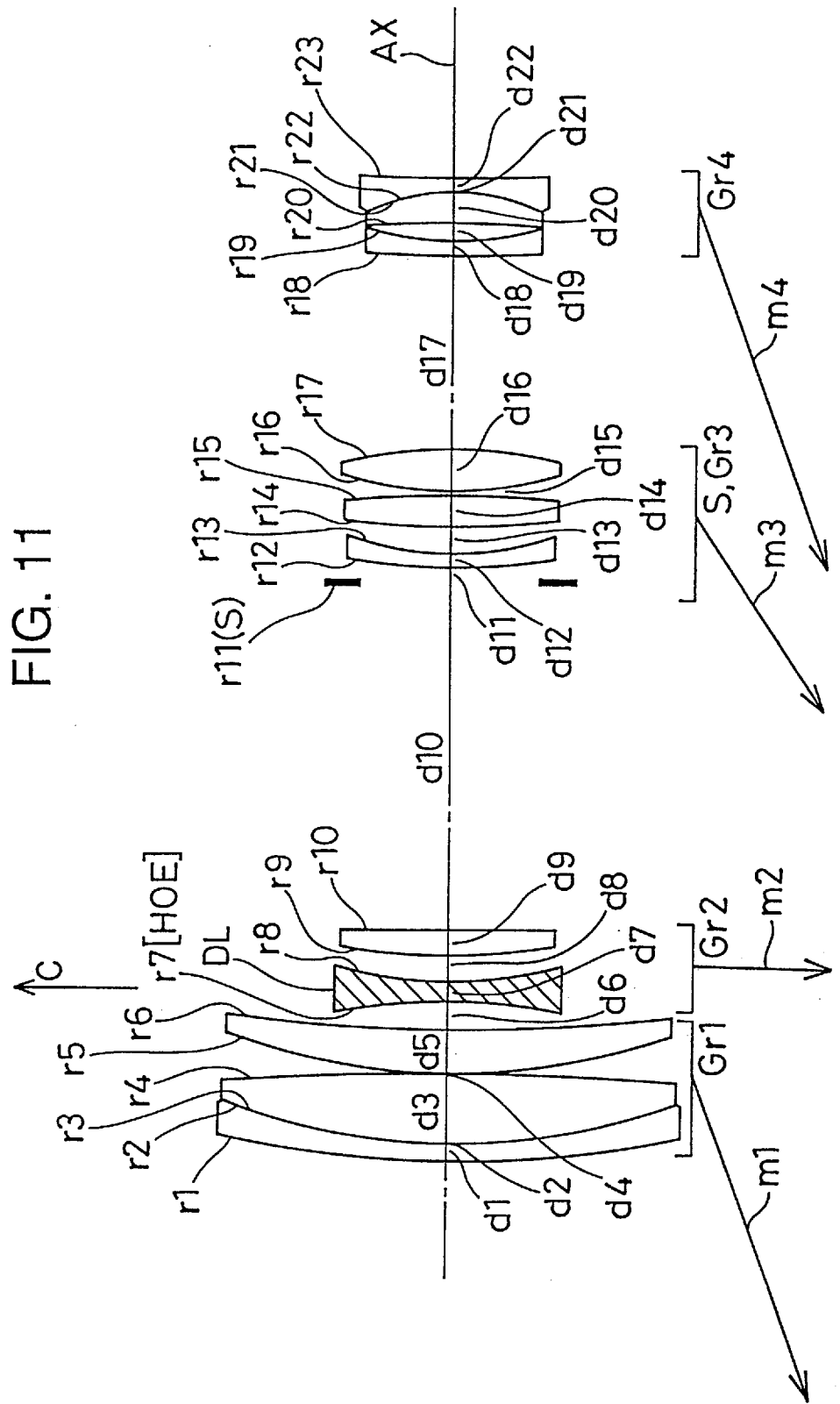
FIG. 11 is a lens construction diagram of the third embodiment of the present invention.
Figure 14A:
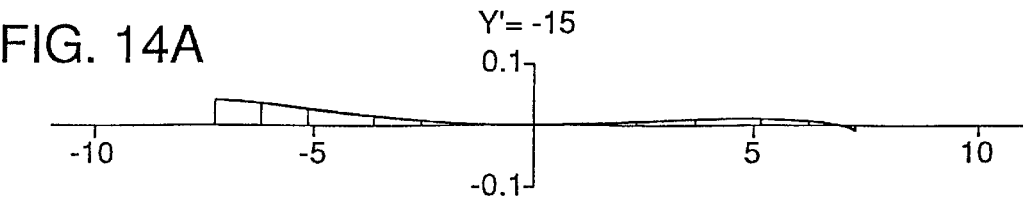
FIGS. 14A to 14F are aberration diagrams showing meridional lateral aberrations observed in the third embodiment, at the wide-angle end, before and after decentering.
Figure 14B:
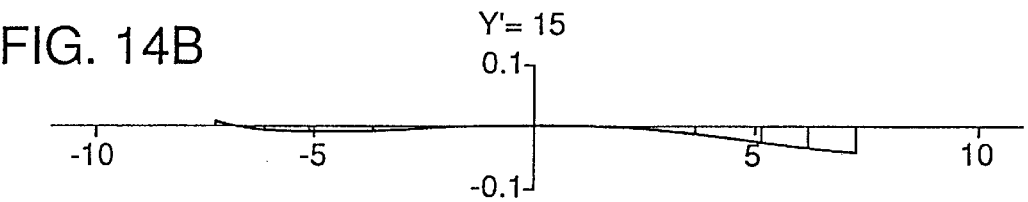
Figure 14C:
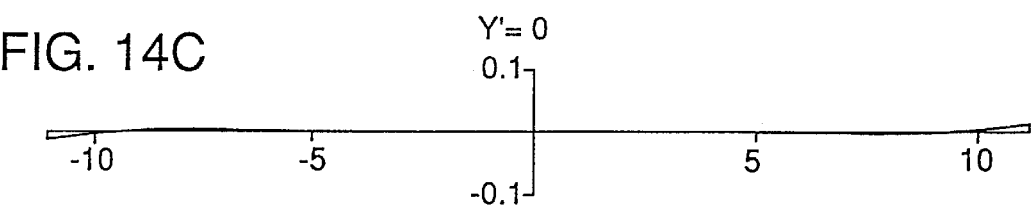
Figure 14D:
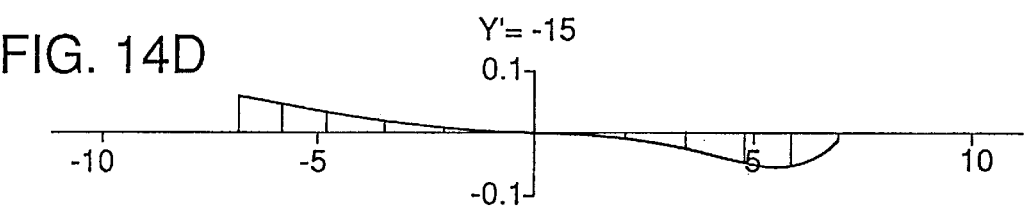
Figure 14E:
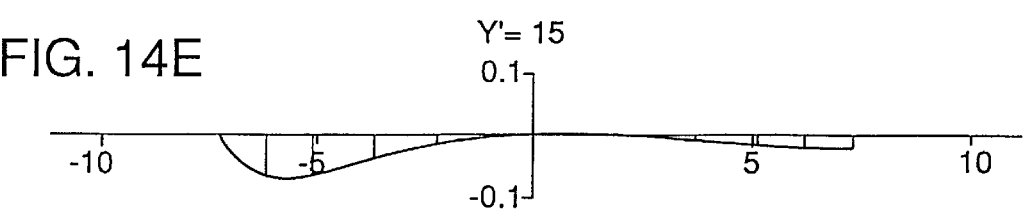
Figure 14F:
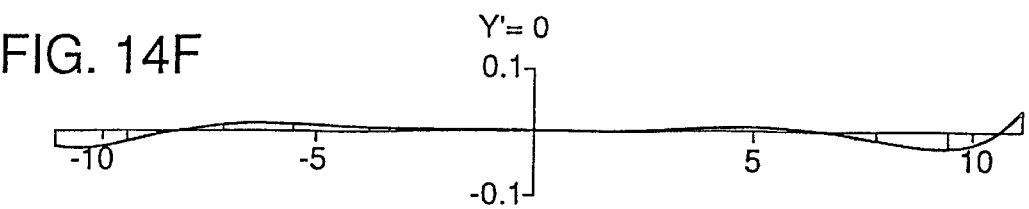
Figure 15A:
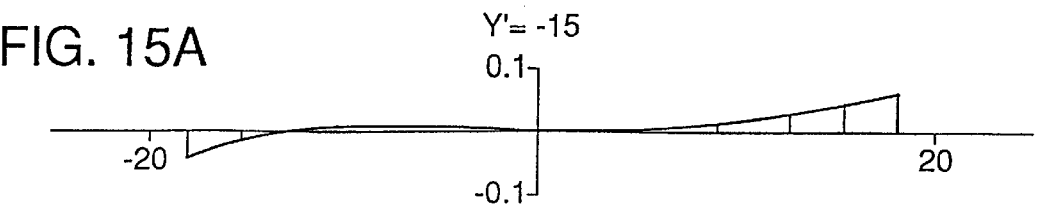
FIGS. 15A to 15F are aberration diagrams showing meridional lateral aberrations observed in the third embodiment, at the telephoto end, before and after decentering.
Figure 15B:
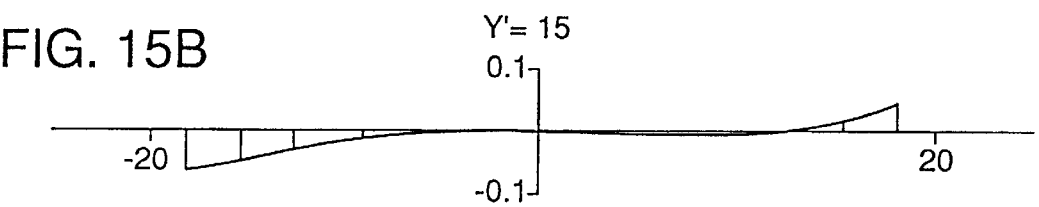
Figure 15C:
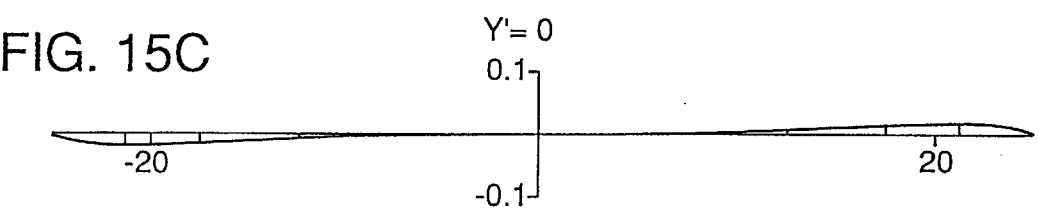
Figure 15D:
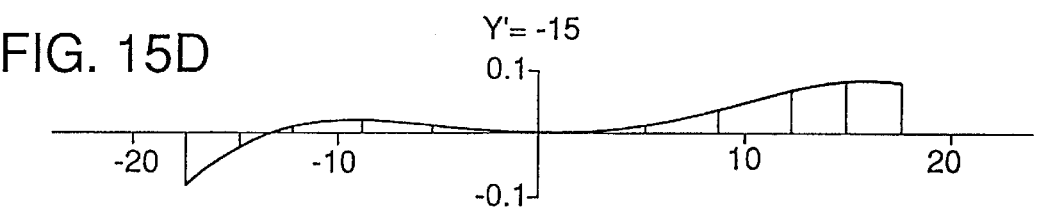
Figure 15E:
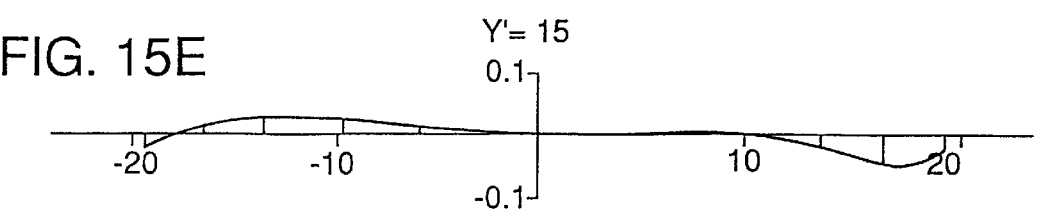
Figure 15F:
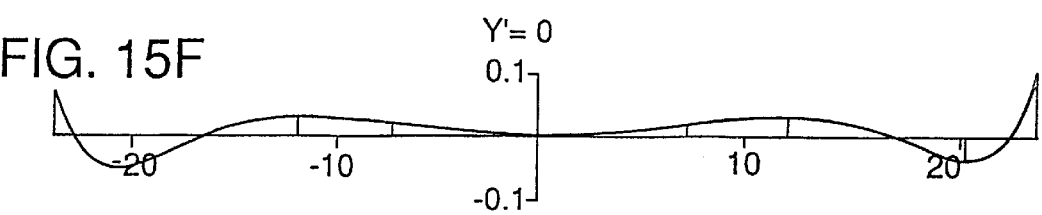
Figure 16:
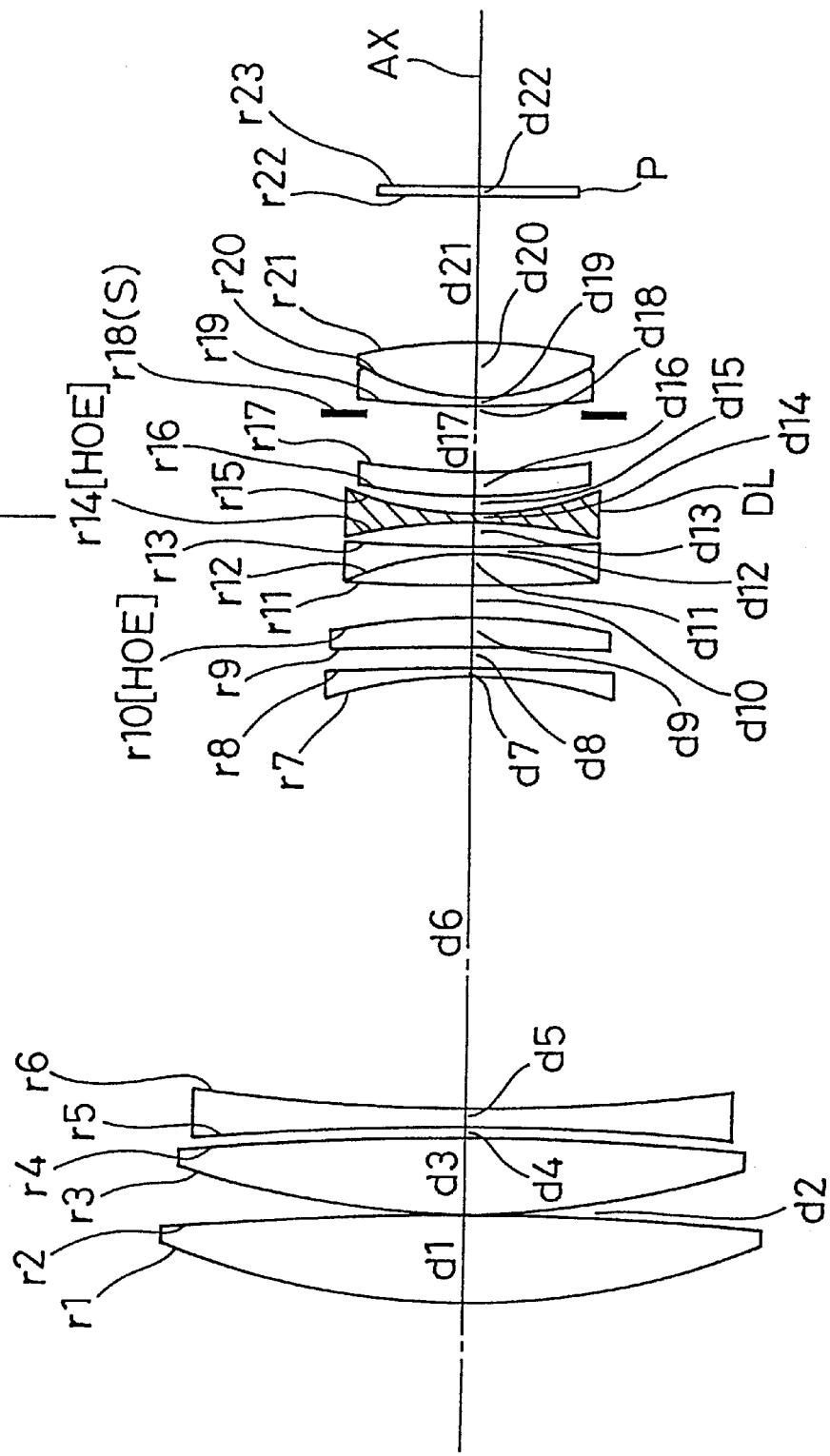
FIG. 16 is a lens construction diagram of the fourth embodiment of the present invention.
Figure 18A:
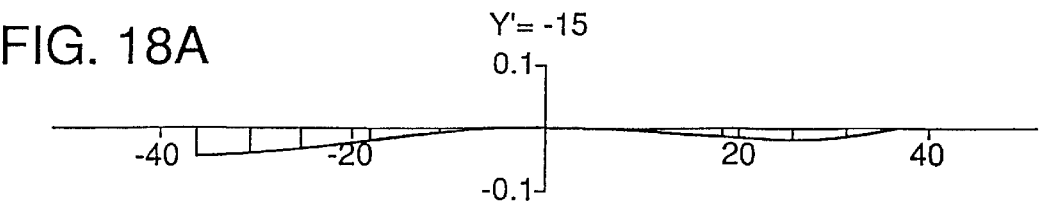
FIGS. 18A to 18F are aberration diagrams showing meridional lateral aberrations observed in the fourth embodiment, before and after decentering.
Figure 18B:
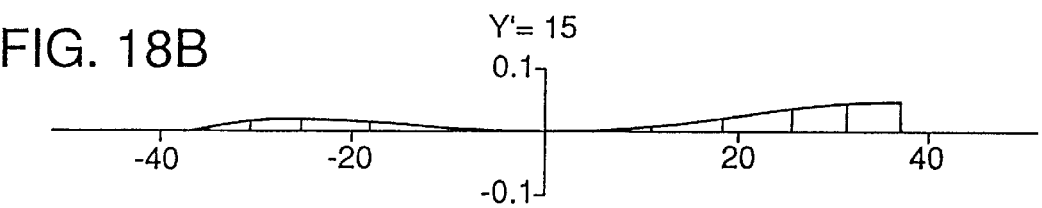
Figure 18C:
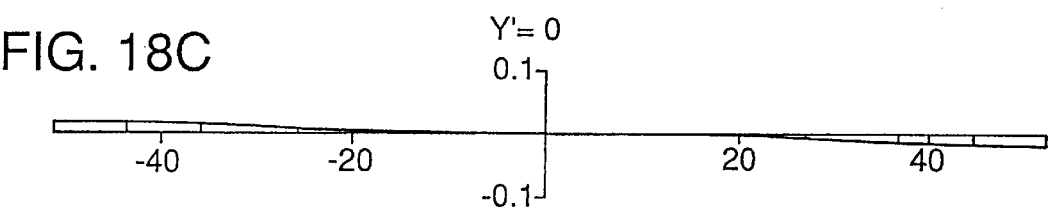
Figure 18D:
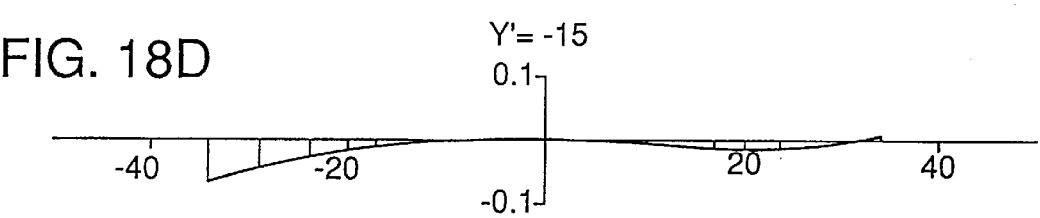
Figure 18E:
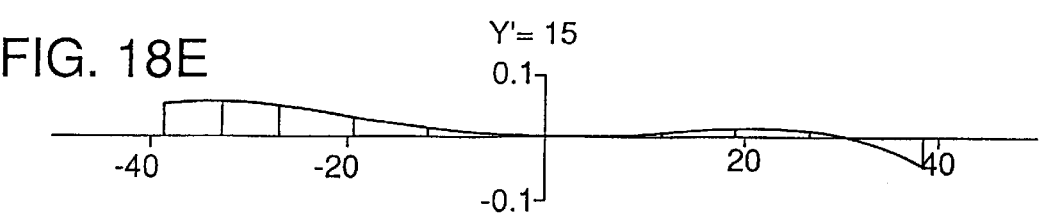
Figure 18F:
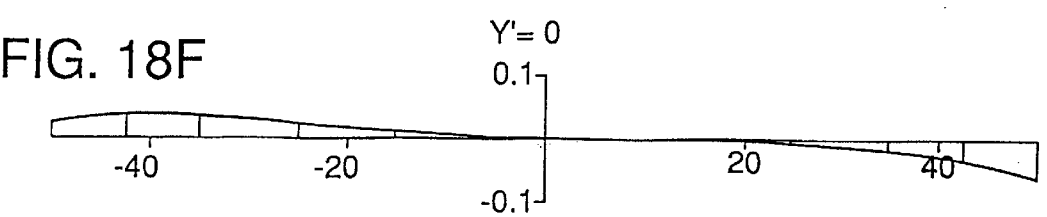
Figure 19:
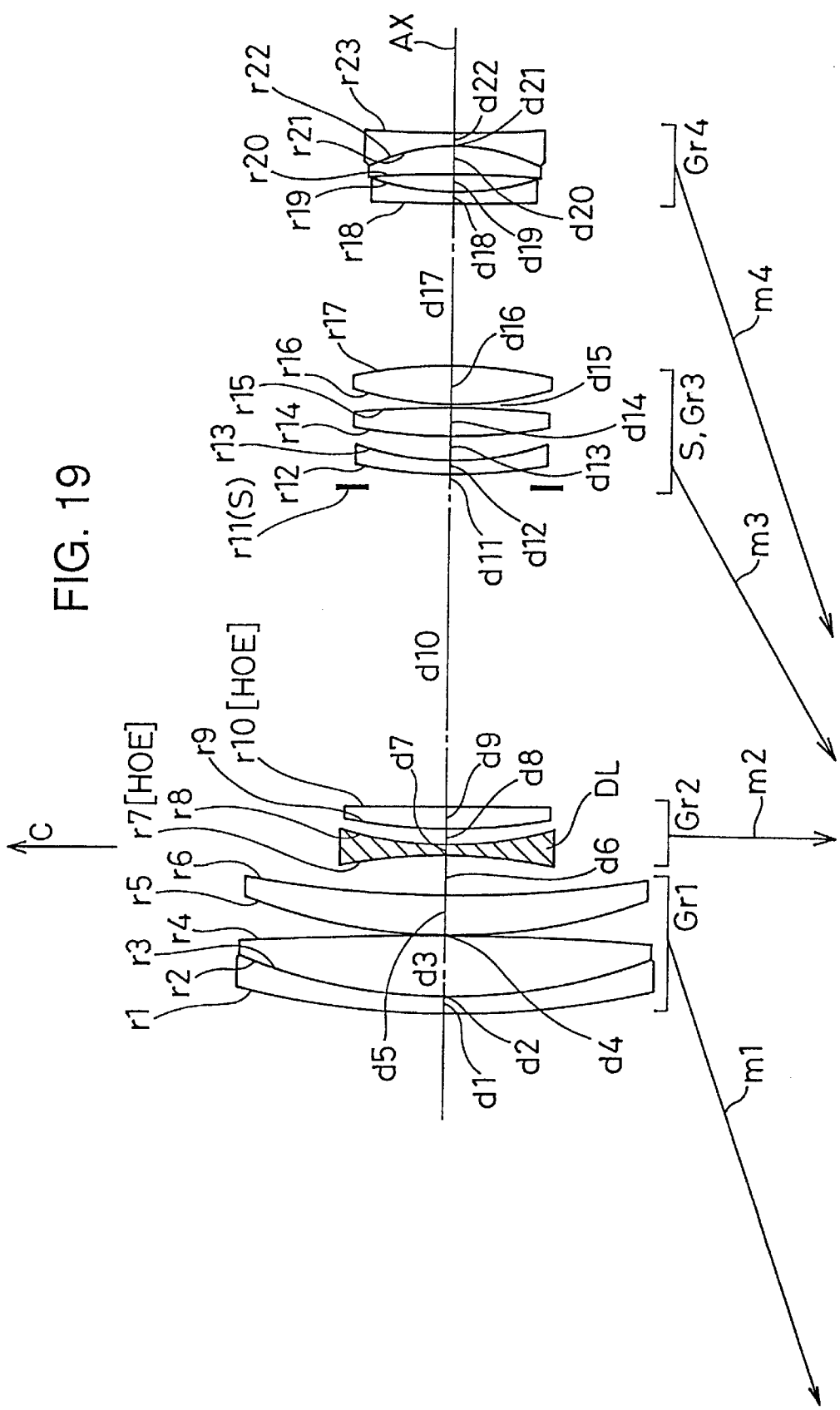
FIG. 19 is a lens construction diagram of the fifth embodiment of the present invention.
Figure 21A:
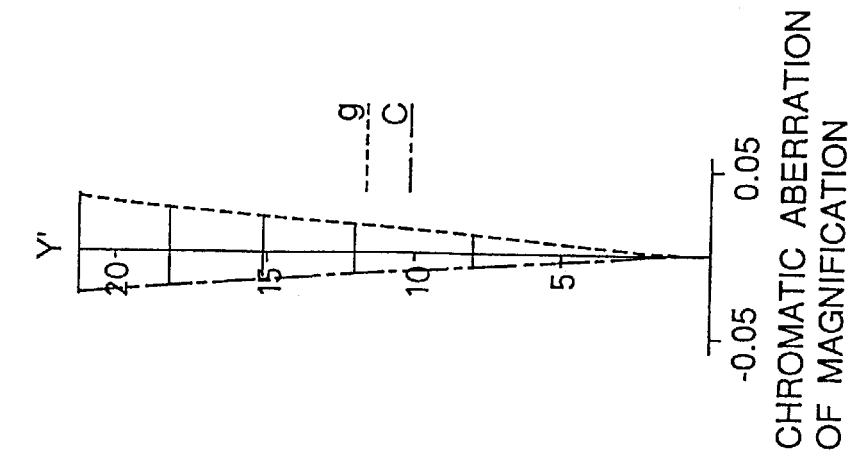
FIGS. 21A to 21D are aberration diagrams showing aberrations observed in the fifth embodiment, at the telephoto end, before decentering.
Figure 21B:
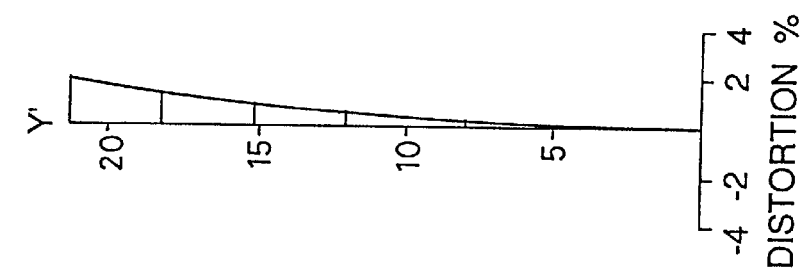
Figure 21C:
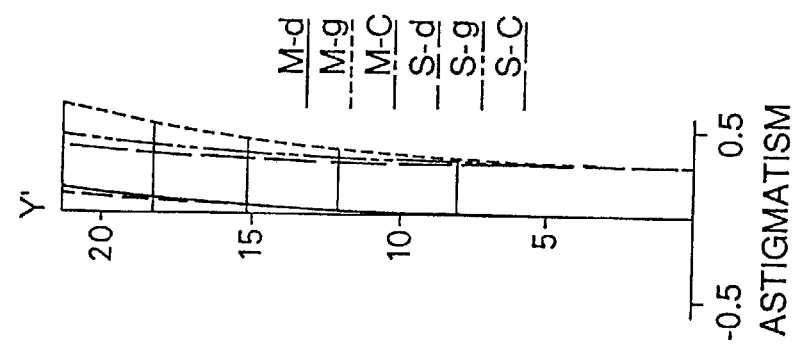
Figure 21D:
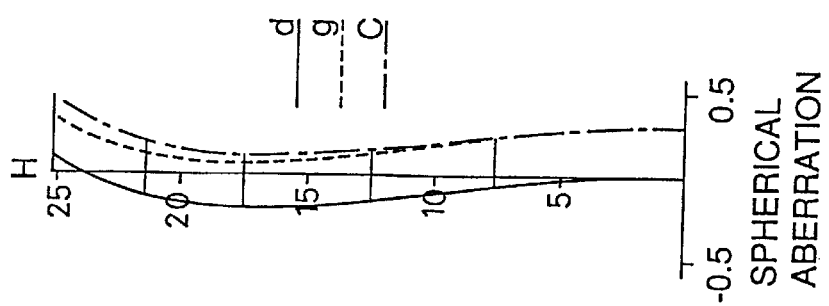
Figure 22A:
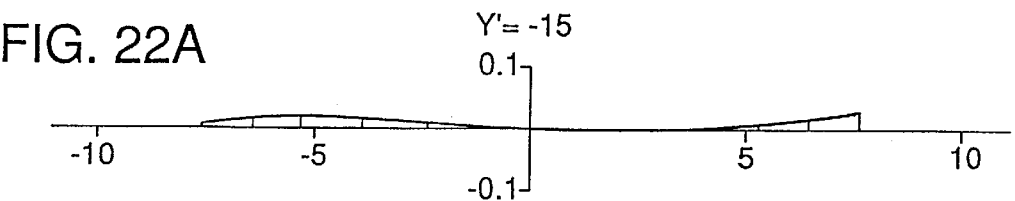
FIGS. 22A to 22F are aberration diagrams showing meridional lateral aberrations observed in the fifth embodiment, at the wide-angle end, before and after decentering.
Figure 22B:
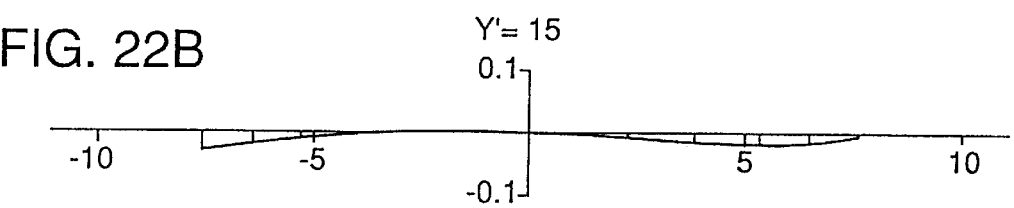
Figure 22C:
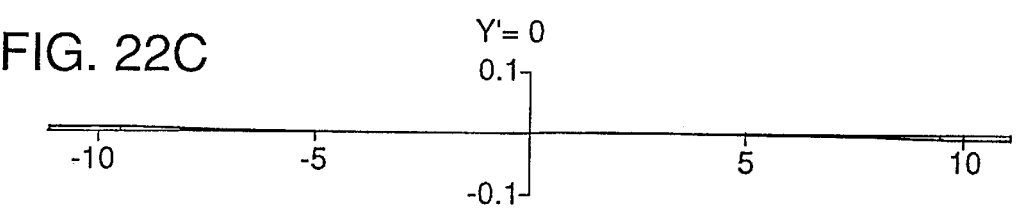
Figure 22D:
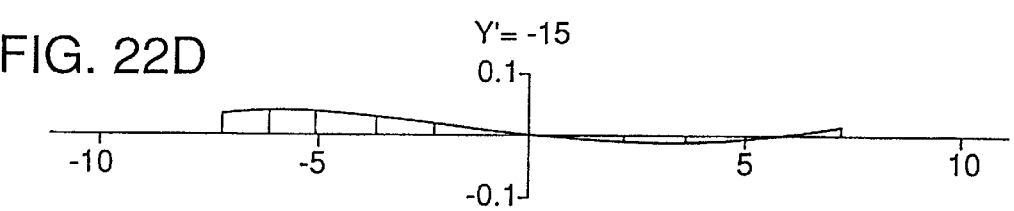
Figure 22E:
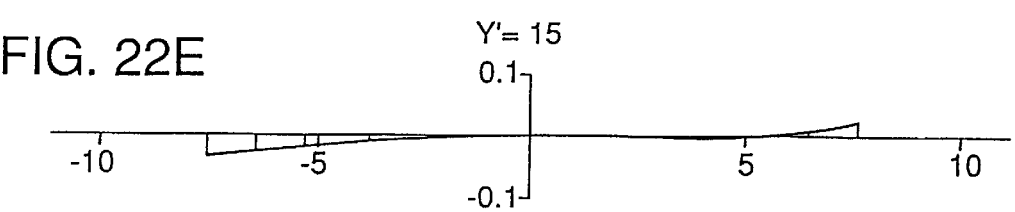
Figure 22F:
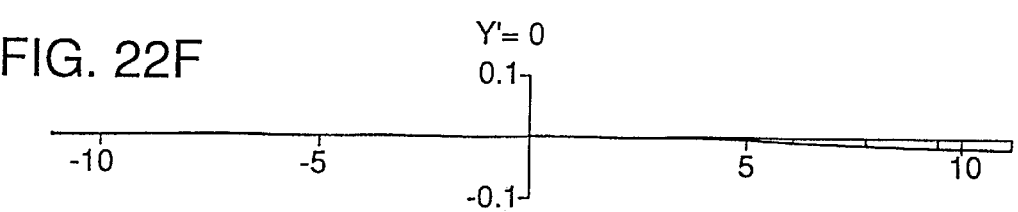
Figure 23A:
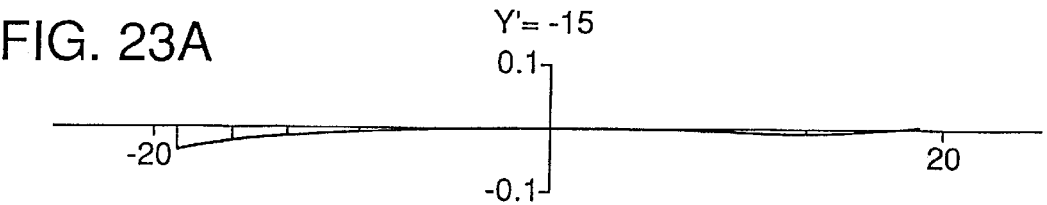
FIGS. 23A to 23F are aberration diagrams showing meridional lateral aberrations observed in the fifth embodiment, at the telephoto end, before and after decentering.
Figure 23B:
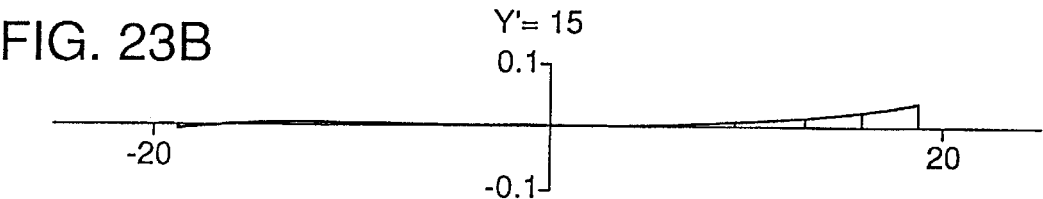
Figure 23C:
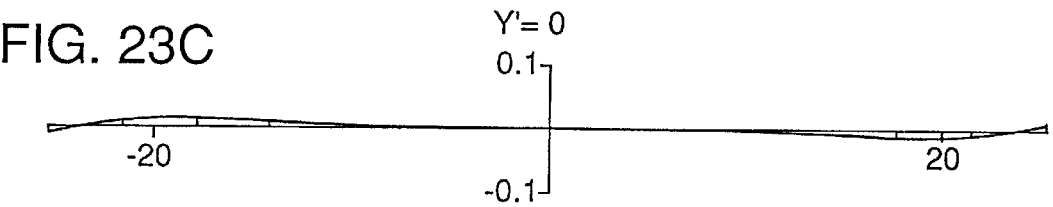
Figure 23D:
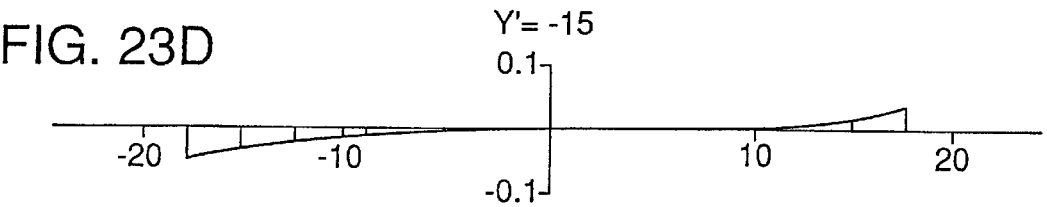
Figure 23E:
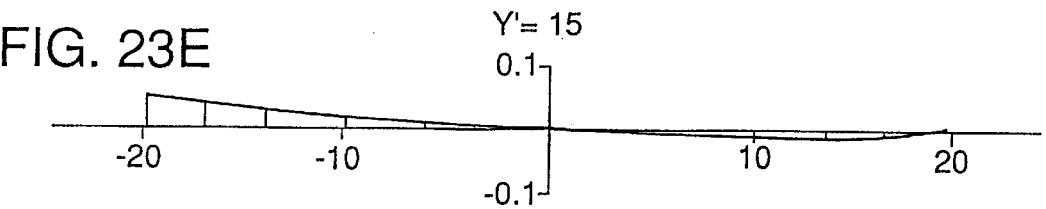
Figure 23F:
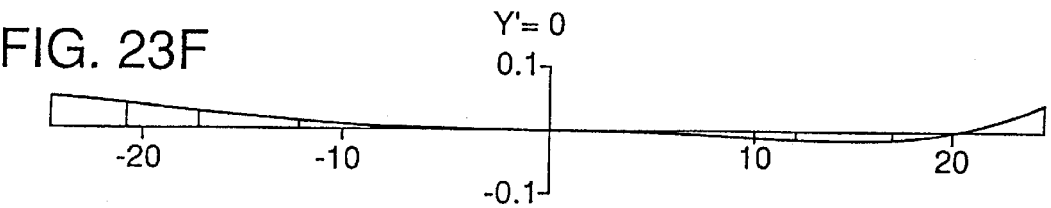

Hereinafter, taking optical systems having a hand-shake correction function embodying the present invention will be described with reference to the drawings. FIGS. 1, 6, 11, 16, and 19 are lens construction diagrams of a first to a fifth embodiment, respectively, in their normal state (before decentering). For the first to third and fifth embodiments, the lens arrangement at the wide-angle end [W] is shown. In each lens construction diagram, ri (i=1, 2, 3, . . . ) represents the radius of curvature of the i-th surface from the object side, and di (i=1, 2, 3, . . . ) represents the i-th axial distance from the object side. In FIGS. 1, 6, 11, and 19, arrows m1, m2, m3, and m4 schematically indicate the movement of a first lens unit Gr1, a second lens unit Gr2, a third lens unit Gr3 with an aperture diaphragm S, and a fourth lens unit Gr4, respectively, during zooming from the wide-angle end [W] to the telephoto end [T].

The taking optical systems of the first to third and fifth embodiments are four-unit telephoto-oriented zoom lens systems, and are each constituted of, from the object side, a first lens unit Gr1 having a positive refractive power, a second lens unit Gr2 having a negative refractive power, a third lens unit Gr3 having a positive refractive power and having an aperture diaphragm S at its upstream end, and a fourth lens unit Gr4 having a negative refractive power. In these taking optical systems, zooming is achieved by varying the distances between the lens units. The taking optical system of the fourth embodiment is a single-focal-length telephoto lens system.

All of the taking optical systems of the first to fifth embodiments have a hand-shake correction function. Specifically, these taking optical systems achieve hand-shake correction by translationally decentering part of the lens elements constituting the taking optical system, more specifically, by moving a particular lens element in a direction perpendicular to the optical axis AX. The lens element that is decentered for hand-shake correction will be referred to as the decentered lens element DL in the following descriptions, and is indicated by hatching in the lens construction diagrams. In FIGS. 1, 6, 11, 16, and 19, arrow C schematically indicates the movement of the decentered lens element DL for hand-shake correction.

The taking optical system of the first embodiment is constructed as follows. The first lens unit Gr1 having a positive refractive power is composed of, from the object side, a negative meniscus lens element with its concave surface facing toward the image side, a biconvex positive lens element, and a positive meniscus lens element with its convex surface facing toward the object side. The second lens unit Gr2 having a negative refractive power is composed of, from the object side, a biconcave negative lens element (used as the decentered lens element DL, and having a diffracting optical surface HOE and an aspherical surface formed on its image-side surface), and a biconvex positive lens element (having an aspherical surface formed on its object-side surface). The third lens unit Gr3 having a positive refractive power is composed of, from the object side, a negative meniscus lens element with its concave surface facing toward the image side, and two biconvex positive lens elements. The fourth lens unit Gr4 having a negative refractive power is composed of, from the object side, a biconcave negative lens element, a positive meniscus lens element with its convex surface facing toward the image side, and a negative meniscus lens element with its concave surface facing toward the object side. In the first embodiment, zooming from the wide-angle end W to the telephoto end T is achieved by moving the first, third, and fourth lens units Gr1, Gr3, and Gr4 toward the object side and moving the second lens unit Gr2 slightly toward the image side so that zooming is achieved in a compact construction.

The taking optical system of the second embodiment is constructed as follows. The first lens unit Gr1 having a positive refractive power is composed of, from the object side, a negative meniscus lens element with its concave surface facing toward the image side, a biconvex positive lens element, and a positive meniscus lens element with its convex surface facing toward the object side. The second lens unit Gr2 having a negative refractive power is composed of, from the object side, a biconcave negative lens element (used as the decentered lens element DL, and having a diffracting optical surface HOE and an aspherical surface formed on its image-side surface), and a positive meniscus lens element with its convex surface facing toward the object side (and having an aspherical surface formed on its object-side surface). The third lens unit Gr3 having a positive refractive power is composed of, from the object side, a negative meniscus lens element with its concave surface facing toward the image side, and two biconvex positive lens elements. The fourth lens unit Gr4 having a negative refractive power is composed of, from the object side, a negative meniscus lens element with its concave surface facing toward the image side, a positive meniscus lens element with its convex surface facing toward the image side, and a negative meniscus lens element with its concave surface facing toward the object side. In the second embodiment, the second lens unit Gr2 having a negative refractive power and including the decentered lens element DL is kept in a fixed position during zooming.

The taking optical system of the third embodiment is constructed as follows. The first lens unit Gr1 having a positive refractive power is composed of, from the object side, a negative meniscus lens element with its concave surface facing toward the image side, a biconvex positive lens element, and a positive meniscus lens element with its convex surface facing toward the object side. The second lens unit Gr2 having a negative refractive power is composed of, from the object side, a biconcave negative lens element (used as the decentered lens element DL, and having a diffracting optical surface HOE formed on its object-side spherical surface and an aspherical surface formed on its image-side surface), and a positive meniscus lens element with its convex surface facing toward the object side (and having an aspherical surface formed on its object-side surface). The third lens unit Gr3 having a positive refractive power is composed of, from the object side, a negative meniscus lens element with its concave surface facing toward the image side, and two biconvex positive lens elements. The fourth lens unit Gr4 having a negative refractive power is composed of, from the object side, a negative meniscus lens element with its concave surface facing toward the image side, a positive meniscus lens element with its convex surface facing toward the image side, and a biconcave negative lens element. In the third embodiment, the second lens unit Gr2 having a negative refractive power and including the decentered lens element DL serves as a fixed zoom unit that is kept in a fixed position during zooming.

The taking optical system of the fourth embodiment is composed of, from the object side, two biconvex positive lens elements, a biconcave negative lens element, a negative meniscus lens element with its concave surface facing toward the object side, a positive meniscus lens element with its convex surface facing toward the image side (having a diffracting optical surface HOE formed on its image-side surface), a doublet lens element of a biconvex positive lens element and a biconcave negative lens element, a biconcave negative lens element (used as the decentered lens element DL, and having a diffracting optical surface HOE formed on its object-side spherical surface and an aspherical surface formed on its image-side surface), a positive meniscus lens element (having an aspherical surface formed on its object-side surface), an aperture diaphragm S, a doublet lens element of a negative meniscus lens element with its concave surface facing toward the image side and a biconvex positive lens element, and a filter P.

The taking optical system of the fifth embodiment is constructed as follows. The first lens unit Gr1 having a positive refractive power is composed of, from the object side, a negative meniscus lens element with its concave surface facing toward the image side, a biconvex positive lens element, and a positive meniscus lens element with its convex surface facing toward the object side. The second lens unit Gr2 having a negative refractive power is composed of, from the object side, a biconcave negative lens element (used as the decentered lens element DL, and having a diffracting optical surface HOE formed on its object-side spherical surface and an aspherical surface formed on its image-side surface), and a plano-convex lens element with its convex surface facing toward the object side (having an aspherical surface formed on its object-side surface and a diffracting optical surface HOE formed on its image-side surface). The third lens unit Gr3 having a positive refractive power is composed of, from the object side, a negative meniscus lens element with its concave surface facing toward the image side, and two biconvex positive lens elements. The fourth lens unit Gr4 having a negative refractive power is composed of, from the object side, a negative meniscus lens element with its concave surface facing toward the image side, a positive meniscus lens element with its convex surface facing toward the image side, and a biconcave negative lens element. In the fifth embodiment, the second lens unit Gr2 having a negative refractive power and including the decentered lens element DL serves as a fixed zoom unit that is kept in a fixed position during zooming.

As described above, in all of the embodiments, at least one diffracting optical surface HOE is formed on the decentered lens element DL. Accordingly, the decentered lens element DL, owing to the diffracting optical surface HOE formed thereon, also functions as a holographic optical element. When at least one diffracting optical surface is formed on the decentered lens element DL, as in these embodiments, it is possible to correct, with the diffracting optical surface, the chromatic aberrations that are caused by the refracting optical surfaces of the decentered lens element DL during hand-shake correction. As a result, it is possible to properly correct chromatic aberrations, which are difficult to correct in a conventional taking optical system having a hand-shake correction function that is composed solely of refracting optical surfaces.

Moreover, in all of the embodiments, the decentered lens element DL is realized as a diffracting/refracting hybrid lens element in which a diffracting optical surface HOE is formed on a refracting optical surface. Accordingly, there is no need to add new lens elements dedicated to the correction of chromatic aberrations. As a result, it is possible to make a taking optical system having a hand-shake correction function almost as compact as a taking optical system having no hand-shake correction function.

In the fourth and fifth embodiments, in addition to the diffracting optical surface HOE formed on the decentered lens element DL, another diffracting optical surface HOE is formed on a lens element other than the decentered lens element DL. In the decentered lens element DL, the refracting optical surfaces have a negative power as a whole, and the diffracting optical surface HOE, which is formed on one of the refracting optical surfaces, also has a negative power., On the other hand, in the lens element on which the other diffracting optical surface HOE is formed, the refracting optical surfaces have a positive power as a whole, and the diffracting optical surface HOE, which is formed on one of the refracting optical surfaces, also has a positive power. When, in a taking optical system, a lens element having a diffracting optical surface in which both the refracting optical surfaces and the diffracting optical surface HOE have positive powers is used in combination with another lens element having a diffracting optical surface in which both the refracting optical surfaces and the diffracting optical surface HOE have negative powers, as in these embodiments, it is possible to further reduce chromatic aberrations over the entire taking optical system.

It is preferable that the decentered lens element DL, which is decentered for hand-shake correction, be realized as a single lens element, as in the first to fifth embodiments. When hand-shake correction is performed by decentering a single lens element, it is possible to reduce the load to be borne by the decentering drive system. Even if the decentered lens element DL is realized as a single lens element, a diffracting optical surface HOE formed on the single lens element makes it possible to satisfactorily suppress aberrations that occur during decentering.

In the first to fifth embodiments, the decentered lens element DL satisfies the previously noted conditions (1) and (2). This makes it possible to minimize aberrations, especially axial lateral chromatic aberrations that occur during hand-shake correction. In the fifth embodiment, the power of the diffracting optical surface HOE of the decentered lens element DL may be relatively stronger than in the first to third embodiments as long as condition (1) is satisfied. This contributes to a further reduction in axial lateral chromatic aberrations that occur during hand-shake correction.

In the second to fifth embodiments, the decentered lens element DL is realized as a plastic lens element. Since plastic lens elements are lighter than glass lens elements, the use of a plastic lens element as the decentered lens element DL makes it possible to reduce the load to be borne by the decentering drive system. Moreover, the use of a plastic lens element is advantageous in that plastic lens elements can be mass-produced by injection molding or other, and in that a diffracting optical surface HOE can be formed on a plastic lens element with much less cost than on a glass lens element.

It is preferable that, as in the first to fifth embodiments, the decentered lens element DL has at lease one aspherical surface. When the decentered lens element DL has at least one aspherical surface, even if the decentered lens element DL has a strong power, it is possible to satisfactorily suppress aberrations that occur when the decentered lens element DL is decentered. By giving a strong power to the decentered lens element DL, it is possible to reduce the decentering amount by which the decentered lens element DL needs to be decentered for a unit hand-shake angle. This, too, makes it possible to reduce the load to be borne by the decentering drive system.

It is preferable that, as in the first and second embodiments, the refracting optical surface on which the diffracting optical surface HOE is formed is an aspherical surface. When the diffracting optical surface HOE is formed on a base surface having an aspherical shape, it is possible to form the aspherical surface at the same as the diffracting optical surface HOE is formed by, for example, machining. This helps reduce production time and improve machining accuracy.

<<Decentering Aberrations and Decentering Aberration Coefficients>>

Next, with reference to FIGS. 24A to 24D, descriptions and definitions will be given as to various types of decentering aberrations that occur in an optical system having a hand-shake correction function (hereinafter referred to as a hand-shake correction optical system) such as a zoom lens system according to the present invention. All types of the decentering aberrations shown in FIGS. 24A to 24D (off-axial image-point movement errors, one-side blur, axial coma, and axial lateral chromatic aberrations) degrade imaging performance of a hand-shake correction optical system.

Figure 24A:
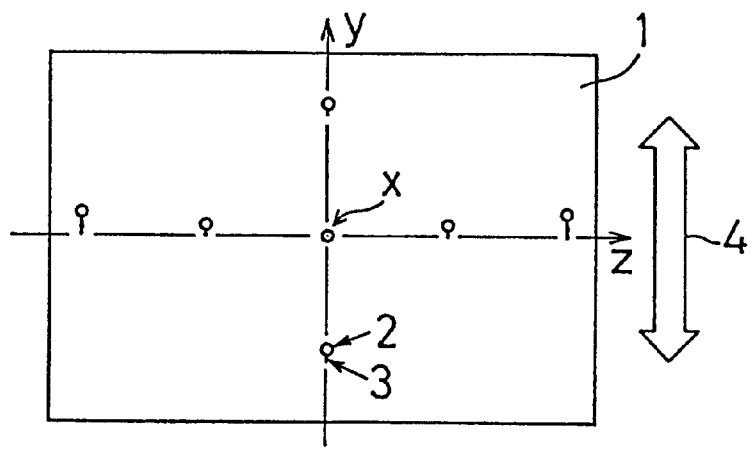
FIGS. 24A to 24D are diagrams illustrating factors causing image degradation in a hand-shake correction optical system.

Off-axial image-point movement errors {FIG. 24A}

In a decentered optical system, in addition to normal distortion, additional distortion occurs as the result of the decentering. For this reason, in a hand-shake correction optical system, if a hand shake is corrected in such a way that axial image points (that is, image points at the center of the image area) are brought to a rest, off-axial image points do not stop completely, and thus cause an image blur. In FIG. 24A, reference numeral 1 represents a film plane, reference numeral 2 represents image points in the hand-shake correction state (post-decentering state), reference numeral 3 represents image points in the normal state (pre-decentering state), and reference numeral 4 indicates the direction in which a hand shake is corrected.

Here, assume that the optical axis is the x axis, and the direction of a hand shake is the y axis (thus, the hand shake is corrected in the y-axis direction). Further, let Y(y', z', θ') be the actual Y coordinate, at a hand-shake correction angle θ, of a light beam with a paraxial image point at (y', z') (note that Y(0, 0, θ)=0 in any case, since correction is performed such that axial image points are brought to a rest). Then, expression (a) below holds.

$$\Delta Y(y',z',\theta)=Y(y',z',\theta)-Y(y',z',0) \tag{a}$$

Unless otherwise specified, the off-axial image-point movement error $\Delta Y_{Y'}$ of an image point on the Y axis and the off-axial image-point movement error $\Delta Y_{Z'}$ of an image point on the Z axis are respectively represented by expressions (b) and (c) below. Here, 0.7 field is approximately 12 mm for new-generation 24 mm film.

$$\Delta Y_{Y'}=\{\Delta Y(0.7 \text{ field},0, 0.7°)+\Delta Y(-0.7 \text{ field}, 0,0.7°)\}/2 \tag{b}$$

$$\Delta Y_{Z'}=\Delta Y(0,0.7 \text{ field},0.7°) \tag{c}$$

Figure 24B:
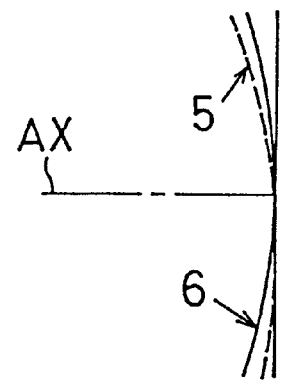

One-side blur {FIG. 24B}

In FIG. 24B, reference numeral 5 represents an image plane that is asymmetrical with respect to the optical axis AX, and reference numeral 6 represents an image plane that is symmetrical with respect to the optical axis AX. When an optical system is asymmetrical, the image plane 5 is asymmetrical with respect to the optical axis AX. In such a case, a meridional one-side blur ΔM' and a sagittal one-side blur ΔS' occur, which are respectively represented by expressions (d) and (e) below.

$$\Delta M'=\{\text{meridional value}(y'=0.7 \text{ field},z=0,\theta=0.7°)-\text{meridional value}(y'=-0.7 \text{ field},z=0,\theta=0.7°)\}/2 \tag{d}$$

$$\Delta S'=\{\text{sagittal value}(y'=0.7 \text{ field},z=0,\theta=0.7°)-\text{sagittal value}(y'=-0.7 \text{ field},z=0,\theta=0.7°)\}/2 \tag{e}$$

Figure 24C:
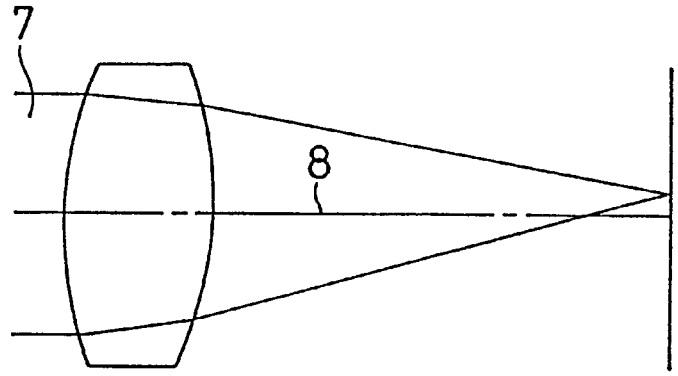

Axial coma {FIG. 24C}

In FIG. 24C, reference numeral 7 represents an axial light beam, and reference numeral 8 represents an axial principal light ray. As shown in the figure, when the axial light beam 7 is not symmetrical with respect to the axial principal light ray 8, coma occurs. The axial coma AXCM developed in the axial light beam 7 is represented by expression (f) below.

$$\text{AXCM}=\{Y(\text{upper zonal},\theta=0.7°)+Y(\text{lower zonal},\theta=0.7°)\}/2 \tag{f}$$

Figure 24D:
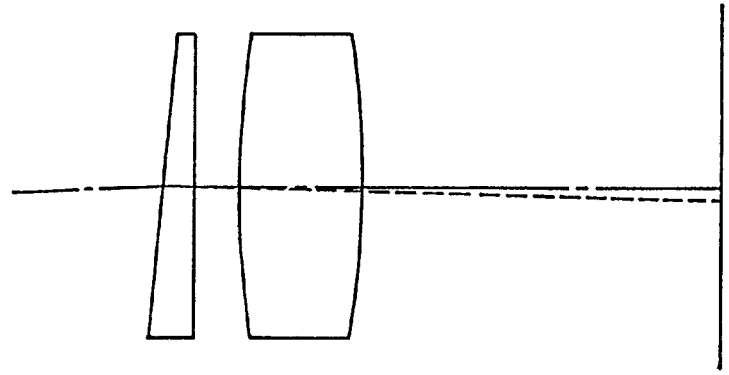

Axial lateral chromatic aberration (FIG. 24D)

Since the position in which a light ray forms its image point varies with its wavelength, even an axial light ray exhibits deviation of the image point in an asymmetrical optical system. For an axial principal light ray, the axial lateral chromatic aberration is represented by expression (g) below.

$$(\text{Axial Lateral Chromatic Aberration})=\{Y(g\text{-lines},\theta=0.7°)-Y(d\text{-lines},\theta=0.7°)\} \tag{g}$$

In connection with the decentering aberration coefficients defined above, their applications are discussed in a thesis by Yoshiya Matsui, titled "On the Third-degree Aberrations in Optical Systems Involving Decentering" (JOEM, June, 1990). The method presented there is however intended to be applied to such a situation where an ordinary taking lens is decentered as a result of improper assembly, and therefore it cannot be applied directly to a hand-shake correction optical system, where the co-axial relationship among the object plane, taking lens, and image plane is intentionally broken. To make it possible to apply the method presented in the above-mentioned thesis to a hand-shake correction optical system, it is necessary to express the aberrations that actually occur in the hand-shake correction optical system as aberration coefficients of the third degree, with the help of the transformation formulae and techniques described hereinafter.

Application of the decentering aberration coefficients to a hand-shake correction optical system.

With reference to FIG. 25, which defines the relationship between the optical system and a coordinate system, the methods for calculating the decentering aberration coefficients will be described. First of all, the following expressions hold:

tan ω·cos φω=Y/g$ tan ω·sin φω=Y/g$

R·cos φR=(g$/g)·Y*

R·sin φR=(g$/g)·Z* where g represents the distance from the entrance-pupil plane to the object plane (object surface) OS, g$ represents the distance from the object-side principal plane to the object plane OS, ω represents the angle of the straight line from the object point to the object-side principal point H with respect to the reference axis of the optical system, φω is its azimuth, R represents the radius of the entrance pupil as seen on the object-side principal plane, and φR is its azimuth.

When the ν-th surface from the object side is decentered translationally a slight distance Eν in the Y direction with respect to the reference axis, the image-point movement amounts ΔY and ΔZ on the image plane (image surface) IS are represented by expressions (1A) and (1B) below.

$$\Delta Y = -(Ev/2a'_k) \cdot [\{\Delta E\}v + (N \cdot \tan\omega)^2 \cdot \qquad (1A)$$
$$\{(2 + \cos 2\phi\omega) \cdot (VE1)v - (VE2)v\} +$$
$$2R \cdot (N \cdot \tan\omega) \cdot \{(2\cos(\phi R - \phi\omega) +$$
$$\cos(\phi R + \phi\omega)) \cdot (IIIE)v + \cos\phi R \cdot$$
$$\cos\phi\omega \cdot (PE)v\} + R^2 \cdot (2 + \cos 2\phi R) \cdot (IIE)v]$$

$$\Delta Z = -(Ev/2a'_k) \cdot [(N \cdot \tan\omega)^2 \cdot \sin 2\phi\omega \cdot \qquad (1B)$$
$$(VE1)v + 2R \cdot (N \cdot \tan\omega) \cdot \{\sin(\phi R + \phi\omega) \cdot$$
$$(IIIE)v + \sin\phi R \cdot \sin\phi\omega \cdot (PE)v\} +$$
$$R^2 \cdot \sin 2\phi R \cdot (IIE)v]$$

Here, if it is assumed that (ΔE)v: prismatic effect (lateral deviation of the image),
(VE1)v, (VE2)v: rotationally asymmetrical distortion,
(IIIE)v, (PE)v: rotationally asymmetrical astigmatism and image-plane inclination,
(IIE)v: rotationally asymmetrical coma that occurs even with axial light rays, then the decentering aberration coefficients that represent the effects of the decentering are represented, on the basis of the aberration coefficients of the lens surfaces from the vth surface to the image plane, by expressions (1C) to (1H) (here, items followed by # are ones related to the object plane). Note that expressions (1A) to (1H) can be used also in the case of rotational decentering.

$$(\Delta E)v = -2(\alpha v' - \alpha v) \qquad (1C)$$

$$(VE1)v = \{\{\alpha v' \cdot (\mu = v+1 \to \kappa)\Sigma V\mu\} - \{\alpha v \cdot (\mu = v \to \kappa)\Sigma V\mu\}\} - \{\{\alpha v'\# \cdot (\mu = v+1 \to \kappa)\Sigma III\mu\} - \{\alpha v\# \cdot (\mu = v \to \kappa)\Sigma III\mu\}\} \qquad (1D)$$

$$(VE2)v = \{\alpha v' \cdot (\mu = v+1 \to \kappa)\Sigma P\mu\} - \{\alpha v \cdot (\mu = v \to \kappa)\Sigma P\mu\} \qquad (1E)$$

$$(IIIE)v = \{\{\alpha v' \cdot (\mu = v+1\kappa)\Sigma III\mu\} - \{\alpha v \cdot (\mu = v \to \kappa)\Sigma III\mu\}\} - \{\{\alpha v'\# \cdot (\mu = v+1\kappa)\Sigma II\mu\} - \{\alpha v\# \cdot (\mu = v \to \kappa)\Sigma II\mu\}\} \qquad (1F)$$

$$(VE2)v = \{\alpha v' \cdot (\mu = v+1\kappa)\Sigma P\mu\} - \{\alpha v \cdot (\mu = v \to \kappa)\Sigma P\mu\} \qquad (1E)$$

$$(IIE)v = \{\{\alpha v' \cdot (\mu = v+1\kappa)\Sigma II\mu\} - \{\alpha v \cdot (\mu = v \to \kappa)\Sigma II\mu\}\} - \{\{\alpha v'\# \cdot (\mu = v+1\kappa)\Sigma I\mu\} - \{\alpha v\# \cdot (\mu = v \to \kappa)\Sigma I\mu\}\} \qquad (1H)$$

However, in applying the decentering aberration coefficients to a hand-shake correction optical system, it is necessary, by reversing the optical system, to replace the image plane IS with the object plane OS in order to obtain aberration coefficients as seen from the image plane IS. That is, the image-point movement amounts need to be converted into those as seen on the object plane OS. The reasons are as follows.

Figure 26A:
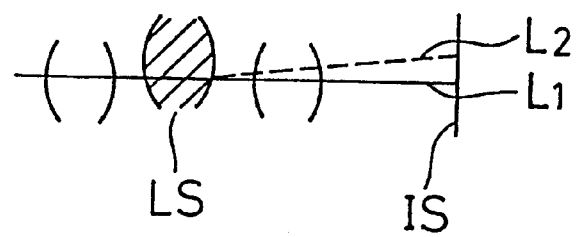
FIGS. 26A and 26B are diagrams illustrating the shift of light-ray paths as a result of decentering.
Figure 26B:
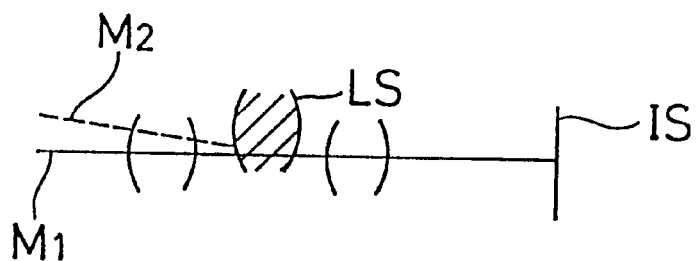

First, there is a difference in how the paths of light rays are affected by the decentering. As shown in FIG. 26A (here, $L_1$ represents a light ray in a normal state without decentering, and $L_2$ represents the same light ray in a decentered state), the method described in the above-mentioned thesis by Y. Matsui deals only with such cases in which it is between the decentered lens LS and the image plane IS that the paths of light rays are affected by the decentered lens LS. In such cases, the decentering aberration coefficients depend on the aberration coefficients of the decentered lens LS and of the lenses disposed between the decentered lens LS and the image plane IS. In contrast, as shown in FIG. 26B (here, $M_1$ represents a light beam before hand-shake correction and $M_2$ represents the same light beam after hand-shake correction), in a hand-shake correction optical system, it is (ideally) on the downstream side of the decentered lens LS that light rays take different paths before and after hand-shake correction. In this case, the decentering aberration coefficients depend on the aberration coefficients of the decentered lens LS and of the lenses disposed on the downstream side of the decentered lens LS.

Figure 27:
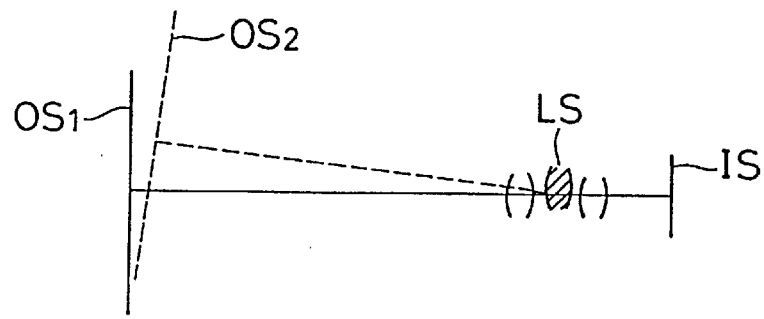
FIG. 27 is a diagram illustrating the rotational conversion of the object plane.

Second, rotational conversion of the object plane may cause additional aberrations. The method described in the above-mentioned thesis by Y. Matsui assumes that the object plane $OS_1$ and the image plane IS are in fixed positions. However, in a hand-shake correction optical system, the object plane $OS_1$ rotates, as shown in FIG. 27. As a result, the off-axial image-point movement errors and the one-side blur occur in a considerably different manner from in cases where the object plane $OS_1$ does not rotate. In FIG. 27, $OS_1$ represents the object plane before hand-shake correction, and $OS_2$ represents the object plane after hand-shake correction.

Aberration coefficients of a reversed optical system and aberration coefficients of a non-reversed optical system.

Figure 28:
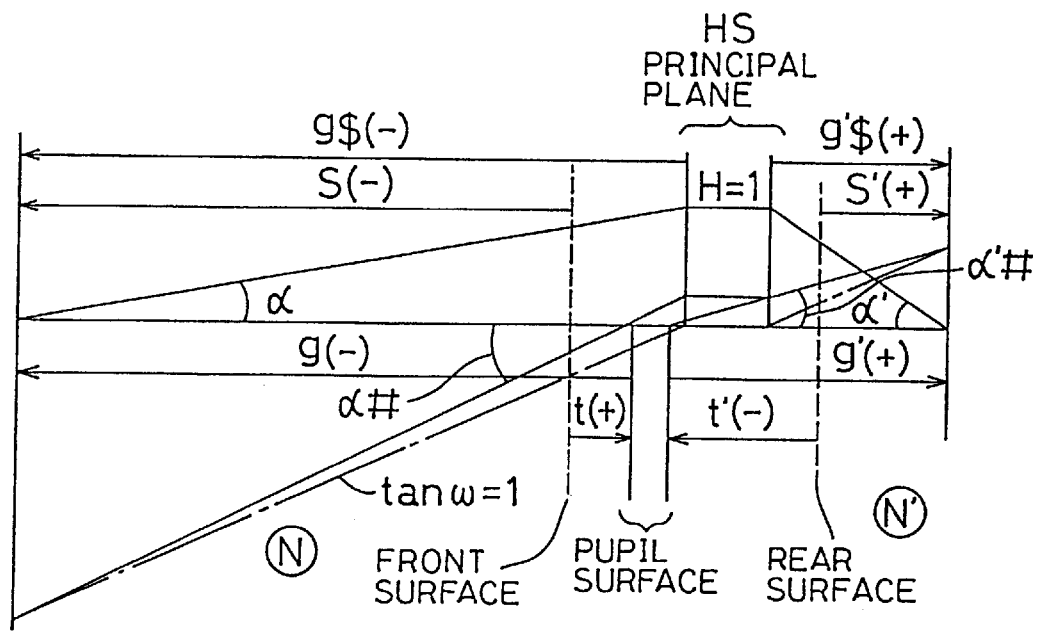
FIG. 28 is a diagram illustrating the aberration coefficients in a reversed and a non-reversed optical system.

For the reasons stated above, it is necessary to convert the image-point movement amounts into those as seen on the object plane. Specifically, the coefficients defined by expressions (1A) to (1H) above are converted according to expressions (2A) to (2J) below, which hold in a reversed optical system as shown in FIG. 28. Note that, here, $^R(\ )$ indicates a reversed system, and N represents the refractive index.

$$^R\alpha = {^RN}/{^Rg}\$ = -\alpha \qquad (2A)$$

$$^R\alpha\# = \alpha'\# \qquad (2B)$$

$$^R\alpha\mu = -\alpha v \qquad (2C)$$

$$^R\alpha\mu' = \alpha v\# \qquad (2D)$$

$$^RP\mu = Pv \quad \text{<non-reversed>} \qquad (2E)$$

$$^R\phi\mu = \phi v \quad \text{<non-reversed>} \qquad (2F)$$

$$^RI\mu = Iv \quad \text{<non-reversed>} \qquad (2G)$$

$$^RII\mu = -IIv \quad \text{<reversed>} \qquad (2H)$$

$$^RIII\mu = IIIv \quad \text{<non-reversed>} \qquad (2I)$$

$$^RV\mu = -Vv \quad \text{<reversed>} \qquad (2J)$$

Decentering aberration coefficients and hand-shake aberration coefficients when a hand-shake correcting lens unit is decentered translationally.

Expressions (1A) to (1H) above assume that only one surface v is decentered. Accordingly, next, expressions (1A) to (1H) need to be further transformed into expressions that can deal with cases where two or more surfaces i~j are decentered. When a hand-shake correction lens unit is decentered translationally, the decentering amounts Ei~Ej of all the decentered surfaces i~j are equal. This means that, in handling the aberration coefficients, it is only necessary to consider their respective sum totals. For example, $$(\Delta E)i \sim j = (v = i \to j)\Sigma\{-2 \cdot (\alpha v' - \alpha v)\}$$

Further, from $\alpha v' = \alpha v + 1$, the following expression is obtained:

$$(\Delta E)i \sim j = 2 \cdot (\alpha j' - \alpha i)$$

In similar manners, the intermediate terms of Σ in the other aberration coefficients can be eliminated. For example, $$(PE)i-j = (\mu = i \to j)\sum \{av' \cdot (\mu = v+l \to k)\sum P\mu - av \cdot$$
$$(\mu = v \to k)\sum P\mu\}$$
$$= aj' \cdot (\mu = j+l \to k)\sum P\mu - ai \cdot (\mu = i \to k)\sum P\mu$$

This is further transformed into $$(PE)i\sim j=(\alpha j'-i)\cdot(\mu\mu=j+1\kappa)\Sigma P\mu-\alpha i\cdot(\mu=i\sim j)\Sigma P\mu$$

where

- $(\mu=j+1-\kappa)\Sigma P\mu$: sum of P's (Petzval sum) of the lenses disposed on the downstream side of the hand-shake correction lens unit;
- $(\mu=i\to j)\Sigma P\mu$: sum of P's (Petzval sum) of the lenses constituting the hand-shake correction lens unit.

Eventually, the following expression is obtained:

$$(PE)i\sim j=(\alpha j'-\alpha i)P_R-\alpha i\cdot P_D$$

where

- $(\ )_R$: the sum of the aberration coefficients of the lenses disposed on the downstream side of the hand-shake correction lens unit;
- $(\ )_D$: the sum of the aberration coefficients of the lenses constituting the hand-shake correction lens unit.

After necessary conversions as described above, which are performed to obtain the image-point movement amounts as seen on the object plane and to cope with cases where two or more surfaces i~j are decentered, the decentering aberration coefficients are reduced to expressions (3A) to (3F) below. Now that the decentering aberration coefficients are redefined by expressions (3A) to (3F), it is possible to use expressions (1A) to (1H), as they are, as definitions of the image-point movement amounts on the object plane.

$$(\Delta E)i\sim j=-2\cdot(\alpha j'-\alpha i) \quad (3A)$$

$$(VE1)i\sim j=(\alpha j\#-\alpha i)\cdot V_R-(\alpha j'\#-\alpha i\#)\cdot III_R-(\alpha i\cdot V_D-\alpha i\#\cdot III_D) \quad (3B)$$

$$(VE2)i\sim j=(\alpha j\#-\alpha i\#)\cdot P_R-\alpha i\#P_D \quad (3C)$$

$$(IIIE)i\sim j=(\alpha j'-\alpha i)\cdot III_R-(\alpha j'\#-\alpha i\#)\cdot II_R-(\alpha i\cdot III_D-\alpha i\#\cdot II_D) \quad (3D)$$

$$(PE)i\sim j=(\alpha j'-\alpha i)\cdot P_R-\alpha i P_D \quad (3E)$$

$$(IIE)i\sim j=(\alpha j'-\alpha i)\cdot II_R-(\alpha j'\#-\alpha i\#)\cdot I_R-(\alpha i\cdot II_D-\alpha i\#\cdot I_D) \quad (3F)$$

Off-axial image-point movement errors.

Next, the off-axial image-point movement errors will be described. Assume that the decentering aberration coefficients (of a reversed optical system) are $\Delta E$, VE1, VE2, IIIE, PE, and IIE. For a principal light ray (R=0), the amounts of the image-point movements caused on the object plane as the result of the decentering (before performing rotational conversion on the object plane) are represented by expressions (4A) and (4B) below. Expressions (4A) and (4B) are obtained by substituting R=0 in expressions (1A) and (1B).

$$\Delta Y\#=-(E/2\alpha'_\kappa)\cdot\{\Delta E+(N\cdot\tan\omega)^2\cdot\{(2+\cos^2\phi\omega)VE1-VE2\}\} \quad (4A)$$

$$\Delta Z\#=-(E/2\alpha')\cdot\{(N\cdot\tan\omega)^2-\sin 2\phi\omega)\cdot VE1\} \quad (4B)$$

From expressions (4A) and (4B), expressions (4C) and (4D) below are obtained (for an axial light ray, tan $\omega$=0).

$$\Delta Y_0\#=-(E/2\alpha'_\kappa)\cdot\Delta E \quad (4C)$$

$$\Delta Z_0\#=0 \quad (4D)$$

Next, the rotational conversion will be described, with reference to FIGS. 29A and 29B. From FIG. 29A, the following expression is obtained:

$$Y\#=g\$_\kappa\cdot\tan\omega$$

This is transformed, using the sine theorem, into $$Y'\#/\{\sin(\pi/2-\omega')\}=(Y\#+\Delta Y\#-\Delta Y_0\#)/\{\sin(\pi/2+\omega'-\theta)\}$$

then, the $\Delta Y'\#$ after the rotational conversion is represented by $$\Delta Y'\# = (Y'\#) - (Y\#)$$
$$= [Y\#\cdot\cos\omega' + \{(\Delta Y\#) - (\Delta Y_0\#)\}\cdot\cos\omega'$$
$$- Y\#\cdot\cos(\omega' - \theta)] / \cos(\omega' - \theta)$$

The numerator of this expression is transformed into $$[Y\#\cdot\cos\omega' + \{(\Delta Y\#) - (\Delta Y_0\#)\}\cdot\cos\omega' - Y\#\cdot\cos(\omega' - \theta)]$$
$$= Y\#\cdot\cos\omega' + \{(\Delta Y\#) - (\Delta Y_0\#)\}\cdot\cos\omega' - Y\#\cdot\cos\theta\cdot\cos\omega' -$$
$$Y\#\cdot\sin\theta\cdot\sin\omega'$$
$$= (1-\cos\theta)\cdot Y\#\cdot\cos\omega' + \{(\Delta Y\#) - (\Delta Y_0\#)\}\cdot\cos\omega' -$$
$$Y\#\cdot\sin\theta\cdot\sin\omega'$$

Here, since $\theta$ is small and negligible compared with the other two terms, $(1-\cos\theta)=\theta^2/2$, sine $\theta=\theta$. Moreover, cos $\theta'/\cos\{(\omega'-\theta))\}=1$, sine $\omega'/\{\cos(\omega'-\theta))\}=\tan\omega$.

Thus, the following expression is obtained.

$$\Delta Y'\#=(\Delta Y\#-\Delta Y_0\#)-Y\#\cdot\theta\cdot\tan\omega$$

where $(\Delta Y\#-\Delta Y_0\#)$ represents the off-axial image-point movement errors resulting from the translational decentering, and $Y\#\cdot\omega\cdot\tan\omega$ is an additional term related to the rotation (but not related to the aberration coefficients). Note that, since $\omega$ here is on the X-Y cross section, $$\Delta Y'\#=(\Delta Y\#-\Delta Y_0\#)-Y\#\cdot\tan\omega\cdot\cos\phi\omega \quad (5A)$$

Next, the conversion to the image plane IS will be described, with reference to FIG. 30. The magnification $\beta$ is defined by $$\beta=g\$_1/g\$=a_\kappa/\alpha_1$$

Here, $\alpha_1=1/g\$_1$. On the other hand, the image plane IS and the object plane OS have a relation $$Y=\beta\cdot Y\#$$

Further, since $Y\#$ and $\Delta Y\#$ retain the form of $1/a_\kappa'\times(\ )$, the above expression is further transformed, as $$Y = \beta\cdot Y\#$$
$$= (a'_k/a_1)\cdot(1/a'_k)\times(\ )$$
$$= gS_1\times(\ )$$

Here, if it is assumed that $g\$_\kappa' \to \infty$, then $g\$_1 = -F1$. Hence, $$Y = -F1 \times (\ )$$
$$= -F1 \times a_k' \times Y_\#$$

Next, the off-axial image-point movement errors on the image plane will be described. From expression (4C) and $\alpha_\kappa' = 1/g_\kappa'\$$, the decentering amount E is obtained as $$\theta = \Delta Y_0 \# / g\$_\kappa' = E \cdot \Delta E/2$$

$$E = 2/\Delta E$$

Then, normalization is performed to make the hand-shake correction angle $\theta$ constant (0.7 deg=0.0122173 rad).

As the result of translational decentering (involving no rotational decentering), $\Delta Y = (\Delta Y \# - \Delta Y_0 \#)$ is subjected to image-plane conversion (here, $N \cdot \tan = \Phi/F1$, $\Phi^2 = Y^2 + Z^2$). Thus, expressions (6A) to (6D) below are obtained.

$$\Delta Y = (\theta \cdot \Phi \cdot / F1) \cdot \{\{(2 + \cos 2 \cdot \phi\omega) \cdot VE1 - VE2\}/\Delta E\} \quad (6A)$$

$$\Delta Z = (\theta \cdot \Phi^2 / F1) \cdot \{\{(\sin 2 \cdot \phi\omega) \cdot VE1 - VE2\}/\Delta E\} \quad (6B)$$

$Y_+$ Image Point, $Y_-$ Image Point $\{\phi\omega = 0, \pi$ of expressions (6A) and (6B)$\}$:

$$\Delta Y_Y = (\theta \cdot Y^2 / F1) \cdot \{(3 \cdot VE1 - VE2)/\Delta E\} \quad (6C)$$

Z Image Point $\{\phi\omega = \pi/2$ of expressions (6A) and (6B)$\}$:

$$\Delta Y_Z = (\theta Z^2 / F1) \cdot \{(VE1 - VE2)/\Delta E\} \quad (6D)$$

These expressions are then subjected to rotational conversion. Since $Y \# = -Y/(F1 \times a_\kappa')$, the term $-Y \# \cdot \theta \cdot \tan \phi\omega$ of the expression (5A) can be expressed as $$-Y \# \cdot \theta \cdot \tan \omega \cdot \cos \phi\omega Y/(F1 \times \alpha_\kappa') \cdot \theta \cdot \tan \omega \cdot \cos \phi\omega$$

At the $Y_+$ and $Y_-$ image points, $\phi\omega = 0, \pi$, and $\tan \omega/a_\kappa' = Y$. Hence, on the image plane, $-Y \# \cdot \theta \cdot \tan \omega \cdot \cos \phi\omega = Y^2 \cdot \theta/F1$. By adding this to expression (6C), expression (6E) below is obtained. On the other hand, at the Z image point, $\phi\omega = \pi/2$. Hence, on the image plane, $-Y \# \cdot \theta \cdot \tan \omega \cdot \cos \phi\omega = 0$. By adding this to expression (6D), expression (6F) below is obtained.

$$\Delta Y_Y' = (\theta Y^2 / F1) \cdot \{(3 \cdot VE1 - VE2 - \Delta E)/\Delta E\} \quad (6E)$$

$$\Delta Y_Z' = \Delta Y_Z \quad (6F)$$

One-side blur.

Next, the one-side blur will be described. From the expressions (1A) and (1B), it is known that $\Delta M$ equals $\{\Delta Y$ with $\theta R = 0$ in the first-degree terms with respect to $R\} \times g\$_\kappa'$ and $\Delta S$ equals $\{\Delta Z$ with $\phi R = \pi/2$ in the first-degree terms with respect to $R\} \times g\$_\kappa'$. On the object plane OS before rotation, the following expression holds (here, it is assumed that $a' = N_\kappa'/g\$_\kappa'$ and $E/2 = \theta/\Delta E$):

$$\Delta M \# = (-g\$_\kappa'^2 \cdot \theta/N_\kappa') \times 2 \cdot R \cdot (N \cdot \tan \omega) \cdot \cos \phi\omega \cdot \{(3 \cdot IIIE + PE)/\Delta E\}$$

After rotation, the following expression holds:

$$\Delta M' \# = \Delta M \# + \theta Y \#$$

By converting the aberration coefficients to those as seen on the image plane and substituting $N_\kappa' = 1$ and $N = 1$, the following expression is obtained:

$$\Delta M' \# = \beta^2 \cdot \Delta M' \#$$
$$= -gS_1^2 \cdot \theta \times 2 \cdot R \cdot \tan\omega \cdot \cos\phi\omega \cdot \{(3 \cdot IIIE + PE)/\Delta E\} + \beta \cdot Y \cdot \theta$$

Assume that the object plane OS is at $\infty$ (that is, $g\$_1 = -F1$, $\beta \to 0$, $\tan \omega = Y/F1$, and $\phi\omega = 0$). Then, the meridional one-side blur $\Delta M'$ is represented by expression (7A) below; likewise, the sagittal one-side blur is represented by expression (7B) below.

$$\Delta M' = -2 \cdot F1 \cdot Y \cdot \theta \cdot R \cdot \{(3 \cdot IIIE + PE)/\Delta E\} \quad (7A)$$

$$\Delta S' = -2 \cdot F1 \cdot Y \cdot \theta \cdot R \cdot \{(IIIE + PE)/\Delta E\} \quad (7B)$$

Axial coma.

Next, the axial coma will be described. From expression (1A), it is known that the coma resulting from upward (upper) decentering of $\omega = 0$ is represented by the following expression:

$$\Delta Y_{Upper} \# = \Delta Y \#(\omega = 0, \phi_R = 0) - \Delta Y \#(\omega = 0, R = 0)$$
$$= -E/(2 \cdot a') \times R^2 \times 3 \cdot IIE$$

On the other hand, the coma resulting from downward (lower) decentering by $\omega = 0$ is represented by the following expression (having the same value and sign as $\Delta Y_{upper} \#$):

$$\Delta Y_{Lower} \# = \Delta Y \#(\omega = 0, \phi_R = \pi) - \Delta Y \#(\omega = 0, R = 0)$$
$$= -E/(2 \cdot a') \times R^2 \times 3 \cdot IIE$$

Since $\omega = 0$, the axial coma is little affected by the rotational conversion. As the result of the conversion from the object plane OS to the image plane IS ($\Delta Y = \beta \cdot \Delta Y \#$, $E/2 = \theta/\Delta E$), the following expression is obtained:

$$\Delta Y_{Upper} = F1 \times \theta R^2 \times (3 \cdot IIE/\Delta E) = \Delta Y_{Lower}$$

Hence, the axial coma AXCM is represented by expression (8A) below:

$$AXCM = (\Delta Y_{Upper} + \Delta Y_{Lower})/2 \quad (8A)$$
$$= \Delta Y_{Upper}$$

By using relevant portions of thus obtained expressions (6E), (6F), (7A), (7B), and (8A), the hand-shake aberration coefficients are now defined by expressions (9A) to (9E) below:

Off-axial image-point movement error of an image point on the Y axis:

$$VE_Y = \{(3 \cdot VE1 - VE2 - \Delta E)/\Delta E\} \quad (9A)$$

Off-axial image-point movement error of an image point on the Z axis:

$$VE_Z = \{(VE1 - VE2)/\Delta E\} \quad (9B)$$

Meridional single-sided blur:

$$IIIE_M = \{(3 \cdot IIIE + PE)/\Delta E\} \quad (9C)$$

Sagittal single-sided blur:

$$IIIE_S = \{(IIIE + PE)/\Delta E\} \quad (9D)$$

Off-axial coma:

$$IIE_A = \{(3 \cdot IIE)/\Delta E\} \quad (9E)$$

These expressions (9A) to (9E), which represent the hand-shake aberration coefficients, are then rearranged by substituting expressions (3A) to (3F) into them, and are eventually transformed into expressions (10A) to (10E) below.

$$VE_Y = -1/2 \cdot \{3V_R - 3V_D \cdot A + 2 - (3\ III_R + P_R) \cdot H\# + (3 \cdot III_D + P_D) \cdot A\#\} \quad (10A)$$

$$VE_Z 1/2 \cdot \{V_R - V_D \cdot A - (III_R + P_R) \cdot H\# + (III_D + P_D) \cdot A\#\} \quad (10B)$$

$$IIIE_M = -1/2 \cdot \{(3 \cdot III_R + P_R) - (3 \cdot III_D + P_D) \cdot A - 3 \cdot II_{R \cdot H\#+} 3 \cdot II_D \cdot A\#\} \quad (10C)$$

$$IIIE_S = -1/2 \cdot \{(III_R + P_R) - (III_D + P_D) \cdot A - II_R \cdot H\# + II_D \cdot A\#\} \quad (10D)$$

$$IIE_A = -3/2 \cdot (II_R + II_{D \cdot A - IR} H\# + I_D \cdot A\#) \quad (10E)$$

where ( )$_D$: sum of the aberration coefficients of the lenses constituting the hand-shake correction lens unit;

( )$_R$: sum of the aberration coefficients of the lenses disposed on the downstream side of the hand-shake correction lens unit;

$A = \alpha i/(\alpha j' - \alpha i)$ (here, the hand-shake correction lens unit is assumed to include surfaces i~j);

$A\# = \alpha i\#/(\alpha j' - \alpha i)$ $H\# = (\alpha i = \# - \alpha i\#)/(\alpha j' - \alpha i)$ Since $\Delta E = -2 \cdot (\alpha j' - \alpha i)$ (here, $(\alpha j' - \alpha i) = \pm 0.0122173$ if $0.7°/mm$) is a coefficient representing (hand-shake correction angle)/(decentering amount), it converges approximately on a predetermined value (though the sign depends on whether the hand-shake correction lens unit has a positive or negative power). Therefore, A represents an incident angle of a marginal light ray to the hand-shake correction lens units (as seen from the image side), and A# varies in proportion to the incident angle of a principal light ray. In cases where h# and h vary only slightly in the hand-shake correction lens unit, then H# represents the ratio of h# of the principal light ray to h of the marginal light ray.

The decentering aberration coefficients defined by expressions (10A) to (10E) are based on a reversed optical system. Accordingly, they now need to be converted back into coefficients based on a non-reversed optical system. To achieve this, expressions (10A) to (10E) are converted, by using expressions (2A) to (2J) noted previously, into expressions (11A) to (11E) below, which represents the aberration coefficients based on a non-reversed optical system.

$$VE_Y = +1/2 \cdot \{3V_F - 3V_D \cdot A - 2 + (3 \cdot III_F + P_F)H\# - (3 \cdot III_D + P_D) \cdot A\#\} \quad (11A)$$

$$VE_Z = +1/2 \cdot \{V_F - V_D \cdot A + (III_F + P_F)H\# - (III_D + P_D) \cdot A\#\} \quad (11B)$$

$$IIIE_M = -1/2 \cdot \{(3 \cdot III_F + P_F) - (3 \cdot III_D + P_D) \cdot A + 3 \cdot II_F \cdot H\# - 3 \cdot II_D \cdot A\#\} \quad (11C)$$

$$IIIE_S = -1/2 \cdot \{(III_F + P_F) - (III_D + P_D) \cdot A + II_F \cdot H\# - II_D \cdot A\#\} \quad (11D)$$

$$IIE_A = +3/2 \cdot (II_F - II_{D \cdot A + IF} \cdot H\# - I_D \cdot A_\#) \quad (11E)$$

where ( )$_D$: sum of the aberration coefficients of the lenses constituting the hand-shake correction lens unit, as seen in a non-reversed optical system;

( )$_F$: sum of the aberration coefficients of the lenses disposed on the upstream side of the hand-shake correction lens unit;

$A = -\alpha n'/(\alpha n' - \alpha m);$ $A\# = \alpha n'\#/(\alpha n' - \alpha m);$ $H\# = -(\alpha n'\# - \alpha m\#)/(\alpha n' - \alpha m) = -(\Sigma h \mu\#) \cdot \phi \mu)/(\Sigma h \mu \cdot \phi \mu);$ $\Delta E = -2(\alpha n' - \alpha m),$ (Here, it is assumed that the hand-shake correction lens unit includes surfaces m→n, the non-reversed optical system j←i).

From expressions (11A) to (11E) above, the following conclusions are drawn.

First, as noted previously, whereas the method described in Y. Matsui's thesis is directed to cases where the hand-shake correction lens unit (i.e. the decentered lens LS) and the lenses disposed on the downstream side thereof affect the optical performance, expressions (11A) to (11E) are directed to cases where the hand-shake correction lens unit and the lenses disposed on the upstream side thereof affect the optical performance.

Second, whereas the off-axial image-point movement errors tend to be larger in wide-angle optical systems (since the focal length F1 of the hand-shake correction lens unit is in the denominator), the one-side blur and axial coma tend to be larger in telephoto optical systems.

Third, although it is possible to reduce the aberrations resulting from the decentering by reducing the aberration coefficients of the hand-shake correction lens unit and the lenses disposed on the upstream side thereof, there still remains a constant term (−2 in { } of expression (11A)) in the coefficient $VE_Y$ representing the off-axial image-point movement errors $\Delta Y_Y'$. This term indicates that the object plane OS and the image plane IS become inclined with respect to each other as a result of a rotational hand shake. And this term (−2) contributes to a considerable increase in off-axial image-point movement errors in wide-angle optical systems. For example, at a focal length F1 of 38 mm, the off-axial image-point movement errors are as large as $\Delta Y_Y = -72\ \mu m$, and are therefore not negligible. Moreover, the off-axial image-point movement errors due to the constant term (−2) remain even when all the aberration coefficients are set to 0. Accordingly, it is preferable to set the aberration coefficients such that the constant term (−2) is canceled out.

Fourth, to reduce the aberrations resulting from the decentering, it is necessary to reduce the aberration coefficients as well as the factors such as A, A#, and H# included therein. As for A and A#, this can be achieved by increasing their denominator $\alpha_n' - \alpha_m$. However, since such an operation directly affects $\Delta E = -2(\alpha_n' - \alpha_m)$, an excessive increase in $\alpha_n - \alpha_m$ leads to an excessively high hand-shake correction sensitivity (how much (°) a light beam is inclined by a unit amount (mm) of decentering), which necessitates high accuracy in the driving mechanism. As for H#, as the hand-shake correction lens unit is disposed closer to aperture diaphragm, h# of each surface becomes smaller, and thus H# also becomes smaller.

Hereinafter, the taking optical systems having a hand-shake correction function of the first to fifth embodiments of the present invention will be presented more specifically with reference to their construction data and aberration characteristics. Tables 1 to 5 show the construction data of the taking optical systems having a hand-shake correction function of the first to fifth embodiments (FIGS. 1, 6, 11, 16, and 19), respectively.

In the construction data of each embodiment, ri (i=1, 2, 3, . . . ) represents the radius of curvature of the i-th surface from the object side, di (i=1, 2, 3, . . . ) represents the i-th axial distance from the object side (before decentering), and Ni (i=1, 2, 3, . . . ) and vi (I=1, 2, 3, . . . ) represent the index of refraction (Nd) and the Abbe number (vd) for d-lines of the i-th lens element from the object side. Also listed in the construction data are the focal length f and the f-number FNO of the entire system. In the construction data of the first to third and fifth embodiments, the axial distances that vary as zooming is performed, that is, the actual axial distances between the lens units, are each represented by two values, which represent, from left, the axial distance at the wide-angle end [W] and the axial distance at the telephoto end [T]; for these embodiments, the focal length f and the f-number FNO of the entire system are also each represented by two values corresponding to these two states.

In the construction data, a surface marked with an asterisk (*) in its column of the radius of curvature ri is an aspherical surface. The shape of an aspherical surface is defined by formula (AS) below.

$$X = \frac{C \cdot Y^2}{1 + (1 - \varepsilon \cdot Y^2 \cdot C^2)^{1/2}} + \sum_i A i Y^i \tag{AS}$$

where

X: displacement from the reference surface of the optical axis direction;
Y: height in a direction perpendicular to the optical axis;
C: paraxial radius of curvature;
$\varepsilon$: quadric surface parameter;
Ai: aspherical coefficient of the i-th degree.

In the construction data, a surface marked with [HOE] in its column of the radius of curvature ri is a refracting optical surface on which a diffracting optical surface is formed. The pitch of a diffracting optical surface is determined by its phase shape, which is defined by formula (HS) below:

$$\phi(H) = 2\pi \cdot \left( \sum_i C i H^{2i} \right) / \lambda 0 \tag{HS}$$

where $\phi$(H): phase function;
Ci: phase coefficient of the 2i-th degree;
H: height in a direction perpendicular to the optical axis;
$\lambda$0: design reference wavelength (=585.75×10$^{-6}$ mm).

The pitch PI of a diffracting optical surface that is actually formed on a lens surface is represented by formula (HS') below. As seen from this formula (HS'), the pitch PI is calculated by partially differentiating $\phi$(H) with respect to a predetermined direction p on the lens surface (that is, with respect to a direction taken arbitrarily on the tangent plane of the lens surface).

$$PI = -2\pi / (\delta\phi/\delta p) \tag{HS'}$$

Table 6 lists values corresponding to and relating to conditions (1) (the power $\phi$d of the diffracting optical surface HOE and the power $\phi$r of the decentered lens element) in each embodiment. Table 7 lists aberration degradation amounts observed in each embodiment during hand-shake correction (at a hand-shake correction angle of $\theta$=0.70°).

FIGS. 2A to 2D and 3A to 3D, 7A to 7D and 8A to 8D, 12A to 12D and 13A to 13D, 17A to 17D, and 20A to 20D and 21A to 21D are aberration diagrams showing various aberrations observed in the first to fifth embodiments, respectively, in their normal state (before decentering). Among these aberration diagrams, FIGS. 2A to 2D, 7A to 7D, 12A to 12D, and 20A to 20D show aberrations observed at the wide-angle end [W], and FIGS. 3A to 3D, 8A to 8D, 13A to 13D, and 21A to 21D show aberrations observed at the telephoto end [T]. Moreover, in aberration diagrams showing spherical aberrations, distortion, and chromatic aberrations of magnification, the solid line (d) represents aberrations for d-lines, the broken line (g) represents aberrations for g-lines, and the dash-dot line (C) represents aberrations for C-lines. In aberration diagrams showing astigmatism, the solid line (M-d), broken line (M-g), and dash-dot line (M-C) represent astigmatism for d-lines, g-lines, and C-lines, respectively, on the meridional plane, and the broken line (S-d), dash-dot-dot line (S-g), and broken line (S-C) represent astigmatism for d-lines, g-lines, and C-lines, respectively, on the sagittal plane.

FIG. 4A to 4F and 5A to 5F, 9A to 9F and 10A to 10F, 14A to 14F and 15A to 15F, 18A to 18F, and 22A to 22F and 23A to 23F are aberration diagrams showing lateral aberrations observed in the first to fifth embodiments, respectively, for light rays on the meridional plane, with FIG. 4A to 4C and 5A to 5C, 9A to 9C and 10A to 10C, 14A to 14C and 15A to 15C, 18A to 18C, and 22A to 22C and 23A to 23C showing lateral aberrations observed before the decentering of the decentered lens element DL, and FIG. 4D to 4F and 5D to 5F, 9D to 9F and 10D to 1F, 14D to 14F and 15D to 15F, 18D to 18F, and 22D to 22F and 23D to 23F showing lateral aberrations observed after the decentering of the decentered lens element DL. Among these aberration diagrams, FIG. 4A to 4F, 9A to 9F, 14A to 14F, and 22A to 22F show lateral aberrations observed at the wide-angle end [W], and FIG. 5A to 5F, 10A to 10F, 15A to 15F, and 23A to 23F show lateral aberrations observed at the telephoto end [T].

More specifically, the aberration diagrams FIG. 4D to 4F and 5D to 5F, 9D to 9F and 10D to 10F, 14D to 14F and 15D to 15F, 18D to 18F, and 22D to 22F and 23D to 23F show aberrations observed when the decentered lens element DL is decentered for hand-shake correction to eventually achieve a hand-shake correction angle of $\theta$=0.70° (=0.0122173 rad) (that is, when the decentered lens element DL is decentered translationally to correct a hand shake of 0.70°). Since a hand shake that occurs within an exposure period of a few tenths of a second to one second has a hand-shake angle e of approximately one degree at most, the optical performance obtained in the hand-correction state for a hand-shake of 0.70° can be considered to be the average optical performance for exposure periods ranging from a few tenths of a second to one second.

As described above, according to the present invention, since the decentered lens element that is decentered for hand-shake correction has at least one diffracting optical surface, it is possible to correct aberrations satisfactorily both in the normal state and in the hand-shake correction state, and it is possible to realize a taking optical system having a hand-shake correction function that is almost as compact as a taking optical system having no hand-shake correction function. Moreover, since aberrations can be corrected properly with the diffracting optical surface as described earlier, even if a single lens is used as the decentered lens element to reduce its weight, it is possible to obtain satisfactory optical performance. As a result, it is possible to reduce the load to be borne by the decentering drive system, and thus it is possible to save power.

TABLE 1

<<Embodiment 1>>
f = 102.5~291.7
FNO = 4.6~5.8

| Radius of Curvature | | Axial Distance | | Index of Refraction | | Abbe Number |
|---|---|---|---|---|---|---|
| r1 | 128.011 | | | | | |
| | | d1 | 2.000 | N1 | 1.68150 ν1 | 36.64 |
| r2 | 65.689 | | | | | |
| | | d2 | 0.100 | | | |
| r3 | 65.689 | | | | | |
| | | d3 | 7.800 | N2 | 1.49310 ν2 | 83.58 |
| r4 | −382.137 | | | | | |
| | | d4 | 0.200 | | | |
| r5 | 61.149 | | | | | |
| | | d5 | 4.980 | N3 | 1.49310 ν3 | 83.58 |
| r6 | 220.307 | | | | | |
| | | d6 | 2.477~56.158 | | | |
| r7 | −104.899 | | | | | |
| | | d7 | 1.700 | N4 | 1.71300 ν4 | 53.93 |
| r8* (HOE) | 52.535 | d8 | 2.950 | | | |
| r9* | 84.723 | | | | | |
| | | d9 | 3.000 | N5 | 1.74950 ν5 | 35.17 |
| r10 | −560.742 | | | | | |
| | | d10 | 33.163~1.971 | | | |
| r11 | ∞ (Aperture Diaphragm S) | | | | | |
| | | d11 | 1.800 | | | |
| r12 | 61.706 | | | | | |
| | | d12 | 1.700 | N6 | 1.84666 ν6 | 23.82 |
| r13 | 33.598 | | | | | |
| | | d13 | 3.060 | | | |
| r14 | 79.103 | | | | | |
| | | d14 | 3.600 | N7 | 1.48749 ν7 | 70.44 |
| r15 | −84.496 | | | | | |
| | | d15 | 0.500 | | | |
| r16 | 43.019 | | | | | |
| | | d16 | 4.800 | N8 | 1.48749 ν8 | 70.44 |
| r17 | −44.692 | | | | | |
| | | d17 | 23.481~0.992 | | | |
| r18 | −331.840 | | | | | |
| | | d18 | 1.700 | N9 | 1.75450 ν9 | 51.57 |
| r19 | 32.788 | | | | | |
| | | d19 | 1.950 | | | |
| r20 | −42.985 | | | | | |
| | | d20 | 3.590 | N10 | 1.70055 ν10 | 27.58 |
| r21 | −17.916 | | | | | |
| | | d21 | 0.010 | N11 | 1.51400 ν11 | 42.83 |
| r22 | −17.916 | | | | | |
| | | d22 | 1.700 | N12 | 1.75450 ν12 | 51.57 |
| r23 | −61.643 | | | | | |
| | | Σd = 106.261 | | | | |

Aspherical Coefficients r8: ε = 1.0000
A4 = −0.33247 × $10^{-5}$
A5 = 0.13062 × $10^{-6}$
A6 = −0.91926 × $10^{-8}$
A8 = 0.42267 × $10^{-11}$
A10 = 0.10985 × $10^{-12}$
A12 = −0.52246 × $10^{-15}$ r9: ε = 1.0000
A4 = −0.29424 × $10^{-5}$
A5 = 0.48339 × $10^{-7}$
A6 = −0.46492 × $10^{-8}$
A8 = 0.20934 × $10^{-11}$
A10 = −0.10223 × $10^{-12}$
A12 = −0.41626 × $10^{-16}$

Phase Coefficients r8: C1 = 1.838 × $10^{-4}$
C2 = 6.832 × $10^{-7}$
C3 = −3.499 × $10^{-11}$
C4 = −9.127 × $10^{-12}$.

TABLE 2

<<Embodiment 2>>
f = 102.5~291.7
FNO = 4.6~5.8

| Radius of Curvature | | Axial Distance | | Index of Refraction | | Abbe Number |
|---|---|---|---|---|---|---|
| r1 | 126.661 | | | | | |
| | | d1 | 2.000 | N1 | 1.66227 ν1 | 36.64 |
| r2 | 70.442 | | | | | |
| | | d2 | 0.100 | | | |
| r3 | 70.442 | | | | | |
| | | d3 | 7.800 | N2 | 1.48642 ν2 | 83.58 |
| r4 | −373.180 | | | | | |
| | | d4 | 0.200 | | | |
| r5 | 69.549 | | | | | |
| | | d5 | 4.980 | N3 | 1.48642 ν3 | 83.58 |
| r6 | 171.852 | | | | | |
| | | d6 | 5.000~60.762 | | | |
| r7 | −75.058 | | | | | |
| | | d7 | 2.317 | N4 | 1.48165 ν4 | 57.49 |
| r8* (HOE) | 46.488 | | | | | |
| | | d8 | 2.950 | | | |
| r9* | 73.653 | | | | | |
| | | d9 | 3.000 | N5 | 1.74260 ν5 | 40.36 |
| r10 | 470.522 | | | | | |
| | | d10 | 35.932~1.971 | | | |
| r11 | ∞ (Aperture Diaphragm S) | | | | | |
| | | d11 | 1.800 | | | |
| r12 | 64.435 | | | | | |
| | | d12 | 1.700 | N6 | 1.81334 ν6 | 23.82 |
| r13 | 34.084 | | | | | |
| | | d13 | 3.060 | | | |
| r14 | 89.529 | | | | | |
| | | d14 | 3.600 | N7 | 1.50733 ν7 | 64.20 |
| r15 | −115.076 | | | | | |
| | | d15 | 0.500 | | | |
| r16 | 40.487 | | | | | |
| | | d16 | 4.800 | N8 | 1.50733 ν8 | 64.20 |
| r17 | −51.703 | | | | | |
| | | d17 | 22.793~0.992 | | | |
| r18 | 260.230 | | | | | |
| | | d18 | 1.700 | N9 | 1.73836 ν9 | 51.57 |
| r19 | 35.308 | | | | | |
| | | d19 | 1.950 | | | |
| r20 | −98.744 | | | | | |
| | | d20 | 3.590 | N10 | 1.65089 ν10 | 29.25 |
| r21 | −21.925 | | | | | |
| | | d21 | 0.010 | N11 | 1.49123 ν11 | 42.83 |
| r22 | −21.925 | | | | | |
| | | d22 | 1.700 | N12 | 1.73836 ν12 | 51.57 |
| r23 | −549.393 | | | | | |
| | | Σd = 111.482 | | | | |

Aspherical Coefficients r8: ε = 1.0000
A4 = −0.38348 × $10^{-5}$
A5 = 0.44405 × $10^{-7}$
A6 = −0.95194 × $10^{-8}$
A8 = 0.19816 × $10^{-10}$
A10 = 0.37202 × $10^{-12}$
A12 = 0.11225 × $10^{-15}$ r9: ε = 1.0000
A4 = −0.17683 × $10^{-5}$
A5 = 0.69642 × $10^{-7}$
A6 = −0.94393 × $10^{-8}$
A8 = −0.32629 × $10^{-10}$
A10 = 0.12889 × $10^{-12}$
A12 = 0.93944 × $10^{-15}$

Phase Coefficients r8: C1 = 1.546 × $10^{-4}$
C2 = 1.041 × $10^{-6}$
C3 = −1.718 × $10^{-9}$
C4 = −3.303 × $10^{-11}$.

TABLE 3

<<Embodiment 3>>
f = 102.5~291.7
FNO = 4.6~5.83

| Radius of Curvature | Axial Distance | | Index of Refraction | | Abbe Number |
|---|---|---|---|---|---|
| r1    124.796 | | | | | |
| | d1 | 2.000 | N1 | ν1 | 36.64 |
| | | | 1.68150 | | |
| r2    71.927 | | | | | |
| | d2 | 0.100 | | | |
| r3    71.927 | | | | | |
| | d3 | 7.800 | N2 | ν2 | 83.58 |
| | | | 1.49310 | | |
| r4   −539.322 | | | | | |
| | d4 | 0.200 | | | |
| r5    72.754 | | | | | |
| | d5 | 4.980 | N3 | ν3 | 83.58 |
| | | | 1.49310 | | |
| r6    189.311 | | | | | |
| | d6 | 3.246~61.789 | | | |
| r7 (HOE)  −70.409 | | | | | |
| | d7 | 2.317 | N4 | ν4 | 57.49 |
| | | | 1.49270 | | |
| r8*    42.405 | | | | | |
| | d8 | 2.950 | | | |
| r9*    66.765 | | | | | |
| | d9 | 3.000 | N5 | ν5 | 40.36 |
| | | | 1.76200 | | |
| r10    8095.200 | | | | | |
| | d10 | 39.827~1.971 | | | |
| r11    ∞ (Aperture Diaphragm S) | | | | | |
| | d11 | 1.800 | | | |
| r12    66.748 | | | | | |
| | d12 | 1.700 | N6 | ν6 | 23.82 |
| | | | 1.84666 | | |
| r13    34.145 | | | | | |
| | d13 | 3.060 | | | |
| r14    78.505 | | | | | |
| | d14 | 3.600 | N7 | ν7 | 64.20 |
| | | | 1.51680 | | |
| r15   −139.566 | | | | | |
| | d15 | 0.500 | | | |
| r16    39.884 | | | | | |
| | d16 | 4.800 | N8 | ν8 | 64.20 |
| | | | 1.51680 | | |
| r17   −53.724 | | | | | |
| | d17 | 21.680~0.992 | | | |
| r18    280.878 | | | | | |
| | d18 | 1.700 | N9 | ν9 | 51.57 |
| | | | 1.75450 | | |
| r19    40.578 | | | | | |
| | d19 | 1.950 | | | |
| r20   −155.183 | | | | | |
| | d20 | 3.590 | N10 | ν10 | 29.25 |
| | | | 1.67339 | | |
| r21   −22.459 | | | | | |
| | d21 | 0.010 | N11 | ν11 | 42.83 |
| | | | 1.51400 | | |
| r22   −22.459 | | | | | |
| | d22 | 1.700 | N12 | ν12 | 51.57 |
| | | | 1.75450 | | |
| r23    202.463 | | | | | |
| Σd = 112.509 | | | | | |

Aspherical Coefficients r8: $\epsilon = 1.0000$
$A4 = -0.40000 \times 10^{-5}$
$A6 = -0.10124 \times 10^{-7}$
$A8 = -0.44091 \times 10^{-12}$
$A10 = 0.27238 \times 10^{-12}$
$A12 = 0.15046 \times 10^{-14}$
r9: $\epsilon = 1.0000$
$A4 = -0.11862 \times 10^{-5}$
$A6 = -0.71444 \times 10^{-8}$
$A8 = -0.19632 \times 10^{-10}$
$A10 = -0.61942 \times 10^{-13}$
$A12 = 0.15776 \times 10^{-14}$ Phase Coefficients r7: $C1 = 8.056 \times 10^{-5}$
$C2 = 9.501 \times 10^{-7}$
$C3 = -1.470 \times 10^{-9}$
$C4 = -2.491 \times 10^{-11}$.

TABLE 4

<<Embodiment 4>>
f = 295.3
FNO = 2.88

| Radius of Curvature | Axial Distance | | Index of Refraction | | Abbe Number |
|---|---|---|---|---|---|
| r1    135.949 | | | | | |
| | d1 | 16.000 | N1 | ν1 | 79.74 |
| | | | 1.49520 | | |
| r2   −775.567 | | | | | |
| | d2 | 0.400 | | | |
| r3    152.241 | | | | | |
| | d3 | 14.000 | N2 | ν2 | 79.74 |
| | | | 1.49520 | | |
| r4   −547.624 | | | | | |
| | d4 | 2.000 | | | |
| r5   −503.816 | | | | | |
| | d5 | 3.500 | N3 | ν3 | 31.72 |
| | | | 1.74000 | | |
| r6    365.548 | | | | | |
| | d6 | 78.000 | | | |
| r7   −90.446 | | | | | |
| | d7 | 1.700 | N4 | ν4 | 47.95 |
| | | | 1.66608 | | |
| r8   −345.999 | | | | | |
| | d8 | 3.365 | | | |
| r9   −1451.547 | | | | | |
| | d9 | 5.500 | N5 | ν5 | 64.20 |
| | | | 1.51680 | | |
| r10 (HOE)  −132.464 | | | | | |
| | d10 | 6.000 | | | |
| r11    1500.916 | | | | | |
| | d11 | 5.500 | N6 | ν6 | 30.11 |
| | | | 1.70055 | | |
| r12   −56.148 | | | | | |
| | d12 | 1.500 | N7 | ν7 | 61.11 |
| | | | 1.58913 | | |
| r13    562.047 | | | | | |
| | d13 | 4.000 | | | |
| r14 (HOE)  −98.490 | | | | | |
| | d14 | 1.500 | N8 | ν8 | 57.82 |
| | | | 1.49140 | | |
| r15*    54.178 | | | | | |
| | d15 | 3.000 | | | |
| r16*    88.113 | | | | | |
| | d16 | 4.500 | N9 | ν9 | 57.82 |
| | | | 1.49140 | | |
| r17    114.665 | | | | | |
| | d17 | 10.252 | | | |
| r18    ∞ (Aperture Diaphragm S) | | | | | |
| | d18 | 1.600 | | | |
| r19    196.790 | | | | | |
| | d19 | 1.600 | N10 | ν10 | 33.88 |
| | | | 1.64769 | | |
| r20    41.948 | | | | | |
| | d20 | 10.000 | N11 | ν11 | 60.74 |
| | | | 1.60311 | | |
| r21   −85.900 | | | | | |
| | d21 | 26.800 | | | |
| r22    ∞ | | | | | |
| | d22 | 1.800 | N12 | ν12 | 64.20 |
| | | | 1.51680 | | |
| r23    ∞ | | | | | |
| Σd = 202.517 | | | | | |

Aspherical Coefficients r15: $\epsilon = 1.0000$
$A4 = -0.15946 \times 10^{-5}$
$A6 = -0.48192 \times 10^{-9}$
r16: $\epsilon = 1.0000$
$A4 = -0.90110 \times 10^{-6}$
$A6 = -0.20563 \times 10^{-9}$ Phase Coefficients r10: $C1 = -3.438 \times 10^{-4}$
$C2 = 0$
$C3 = 1.043 \times 10^{-11}$
$C4 = 0$
r14: $C1 = 4.356 \times 10^{-4}$
$C2 = 0$
$C3 = -5.950 \times 10^{-11}$
$C4 = 0$.

TABLE 5

<<Embodiment 5>>
f = 102.5~291.7
FNO = 4.6~5.8

| Radius of Curvature | | Axial Distance | Index of Refraction | | Abbe Number |
|---|---|---|---|---|---|
| r1 | 118.273 | | | | |
| | | d1 2.000 | N1 1.68150 | V1 | 36.64 |
| r2 | 68.375 | | | | |
| | | d2 0.100 | | | |
| r3 | 68.375 | | | | |
| | | d3 7.800 | N2 1.49310 | v2 | 83.58 |
| r4 | −473.608 | | | | |
| | | d4 0.200 | | | |
| r5 | 72.408 | | | | |
| | | d5 4.980 | N3 1.49310 | v3 | 83.58 |
| r6 | 151.422 | | | | |
| | | d6 5.000~4.097 | | | |
| r7 (HOE) | 70.409 | d7 1.500 | N4 1.49140 | v4 | 57.82 |
| r8* | 41.271 | | | | |
| | | d8 1.950 | | | |
| r9* | 65.998 | | | | |
| | | d9 3.000 | N5 1.76200 | v5 | 40.36 |
| r10 (HOE) | ∞ | | | | |
| | | d10 41.250~1.971 | | | |
| r11 | ∞ (Aperture Diaphragm S) | | | | |
| | | d11 1.800 | | | |
| r12 | 65.465 | | | | |
| | | d12 1.700 | N6 1.84666 | v6 | 23.82 |
| r13 | 35.046 | | | | |
| | | d13 3.060 | | | |
| r14 | 72.960 | | | | |
| | | d14 3.600 | N7 1.51680 | v7 | 64.20 |
| r15 | −119.366 | | | | |
| | | d15 0.500 | | | |
| r16 | 41.049 | | | | |
| | | d16 4.800 | N8 1.51680 | v8 | 64.20 |
| r17 | −59.112 | | | | |
| | | d17 20.810~0.992 | | | |
| r18 | 271.752 | | | | |
| | | d18 1.700 | N9 1.75450 | v9 | 51.57 |
| r19 | 39.459 | | | | |
| | | d19 1.950 | | | |
| r20 | −176.891 | | | | |
| | | d20 3.590 | N10 1.67339 | v10 | 29.25 |
| r21 | −23.787 | | | | |
| | | d21 0.010 | N11 1.51400 | v11 | 42.83 |
| r22 | −23.787 | | | | |
| | | d22 1.700 | N12 1.75450 | v12 | 51.57 |
| r23 | 179.437 | | | | |
| | Σd = 113.000 | | | | |

Aspherical Coefficients r8: ε = 1.0000
A4 = −0.43441 × $10^{-5}$
r9: ε = 1.0000
A4 = −0.22445 × $10^{-5}$ Phase Coefficients r7: C1 = 4.369 × $10^4$
C2~C4 = 0
r10: C1 = −3.555 × $10^{-4}$
C2~C4 = 0.

TABLE 6

| | Emb. 1 | Emb. 2 | Emb. 3 |
|---|---|---|---|
| φd | −3.6 × $10^{-4}$ | −3.0 × $10^{-4}$ | −1.6 × $10^{-4}$ |
| φr | −2.1 × $10^{-2}$ | −1.8 × $10^{-2}$ | −1.9 × $10^{-2}$ |
| φd/φr | 0.017 | 0.017 | 0.008 |

TABLE 6-continued

| | Emb. 4 | Emb. 5 |
|---|---|---|
| φd | −8.7 × $10^{-4}$ | −8.7 × $10^{-4}$ |
| φr | −1.5 × $10^{-2}$ | −2.0 × $10^{-2}$ |
| φd/φr | 0.058 | 0.044 |

TABLE 7

| | | Emb. 1 | Emb. 2 | Emb. 3 |
|---|---|---|---|---|
| Off-axial Image-point Movement Errors (Y'=15) | (W) | 0.003 | 0.012 | 0.014 |
| | (T) | −0.016 | −0.008 | −0.002 |
| One-side Blur (Y'=15, meridional) | (W) | 0.310 | 0.160 | 0.239 |
| | (T) | −0.041 | −0.015 | −0.003 |
| Axial Coma | (W) | 0.002 | −0.003 | −0.005 |
| | (T) | 0.022 | 0.013 | −0.002 |
| Axial Lateral Chromatic Aberrations | (W) | 0.023 | 0.021 | 0.024 |
| | (T) | 0.044 | 0.040 | 0.048 |

| | | Emb. 4 | Emb. 5 |
|---|---|---|---|
| Off-axial Image-point Movement Errors (Y'=15) | (W) | −0.016 | −0.001 |
| | (T) | | −0.001 |
| One-side Blur (Y'=15, meridional) | (W) | 0.040 | 0.332 |
| | (T) | | −0.243 |
| Axial Coma | (W) | 0.009 | −0.005 |
| | (T) | | 0.009 |
| Axial Lateral Chromatic Aberrations | (W) | 0.017 | 0.011 |
| | (T) | | 0.016 |

What is claimed is:

1. An optical system capable of correcting an image blur resulting from vibration of the optical system, including:

a movable lens element that is movable in direction perpendicular to an optical axis and that has a diffracting optical surface, said diffracting optical surface having a diffractive optical power which corrects chromatic aberration caused by decentering the lens element.

2. An optical system as claimed in claim 1, wherein said movable lens element is a single lens element.

3. An optical system as claimed in claim 2, wherein said diffracting optical surface is formed on a refracting optical surface of said movable lens element.

4. An optical system as claimed in claim 3, wherein said movable lens element satisfies the following conditions:

$0.005 < \phi d/\phi r < 0.10$ $\nu dr > 50$ where

φd: power of the diffracting optical surface;
φr: composite power of refracting optical surfaces;
νdr: Abbe number.

5. An optical system as claimed in claim 3, further including:

another lens element in which a diffracting optical surface is formed on a refracting optical surface, wherein, in said movable lens element, said refracting optical surface and said diffracting optical surface formed thereon have negative powers and, in said another lens element, said refracting optical surface and said diffracting optical surface formed thereon have positive powers.

6. An optical system as claimed in claim 1,
wherein said movable lens element is a plastic lens element.

7. An optical system as claimed in claim 1,
wherein said movable lens element has at least one aspherical surface.

8. An optical system capable of correcting an image blur resulting from vibration of the optical system comprising, from an object side:
   a first lens unit having a positive refractive power;
   a second lens unit having a negative refractive power;
   a third lens unit having a positive refractive power; and
   a fourth lens unit having a negative refractive power,
   wherein said second lens unit includes a movable lens element that is movable in a direction perpendicular to an optical axis and that has a diffracting optical surface, said diffracting optical surface having a diffractive optical power which corrects chromatic aberration caused by decentering the lens element.

9. An optical system as claimed in claim 8,
wherein said movable lens element is a single lens element.

10. An optical system as claimed in claim 9,
wherein said diffracting optical surface is formed on a refracting optical surface of said movable lens element.

11. An optical system as claimed in claim 10,
wherein said movable lens element satisfies the following conditions:

$$0.005 < \phi d/\phi r < 0.10$$

$$\nu dr > 50$$

where
$\phi d$: power of the diffracting optical surface;
$\phi r$: composite power of refracting optical surfaces;
$\nu dr$: Abbe number.

12. An optical system as claimed in claim 8,
wherein said movable lens element is a plastic lens element.

13. An optical system as claimed in claim 8,
wherein said movable lens element has at least one aspherical surface.

14. An optical system capable of correcting an image blur resulting from vibration of the optical system, including
   a movable lens element that is movable in a direction perpendicular to an optical axis and that has a diffracting optical surface formed on a refracting optical surface of said movable lens element,
   wherein said movable lens element satisfies the following conditions:

$$0.005 < \phi d/\phi r < 0.10$$

$$\nu dr > 50$$

where
$\phi d$: power of the diffracting optical surface;
$\phi r$: composite power of refracting optical surfaces;
$\nu vdr$: Abbe number.

15. An optical system capable of correcting an image blur resulting from vibration of the optical system, including:
   a movable lens element that is movable in a direction perpendicular to an optical axis and that has a diffracting optical surface formed on a refracting optical surface of said movable lens element; and
   another lens element in which a diffracting optical surface is formed on a refracting optical surface,
   wherein, in said movable lens element, said refracting optical surface and said diffracting optical surface formed thereon have negative powers and, in said another lens element, said refracting optical surface and said diffracting optical surface formed thereon have positive powers.

16. An optical system as claimed in claim 15, wherein said movable lens element is a plastic lens element.

17. An optical system as claimed in claim 16, wherein said movable lens element has at least one aspherical surface.

18. An optical system capable of correcting an image blur resulting from vibration of the optical system, comprising for an object side:
   a first lens unit having a positive refractive power;
   a second lens unit having a negative refractive power;
   a third lens unit having a positive refractive power; and
   a fourth lens unit having a negative refractive power,
   wherein zooming is performed by varying distances between said lens units, and
   wherein said second lens unit includes a movable lens element that is movable in a direction perpendicular to an optical axis and that has a diffracting optical surface formed on a refracting optical surface of said movable lens element,
   wherein said movable lens element satisfies the following conditions:

$$0.005 < \phi d/\phi r < 0.10$$

$$\nu dr > 50$$

where
$\phi d$: power of the diffracting optical surface;
$\phi r$: composite power of refracting optical surfaces;
$\nu dr$: Abbe number.

19. An optical system as claimed in claim 18, wherein said movable lens element is a plastic lens element.

20. An optical system as claimed in claim 18, wherein said movable lens element has at least one aspherical surface.

21. An optical system capable of correcting an image blur resulting from vibration of the optical system, comprising:
   a movable lens element mounted to be movable in a direction perpendicular to an optical axis and that has a diffracting a spherical optical surface,
   wherein said movable lens element satisfies the following conditions:

$$0.005 < \phi d/\phi r < 0.10$$

$$\nu dr > 50$$

where
$\phi d$: power of the diffracting optical surface;
$\phi r$: composite power of refracting optical surfaces;
$\nu dr$: Abbe number.

22. An optical system as claimed in claim 21, further including a plurality of movable lens units for providing a zooming mode of operation, the movable lens element being included in one of the movable lens units.

23. A zoom lens system capable of correcting an image blur resulting from vibration of the optical system, including:
   a most object side lens unit;
   a lens unit provided at an image side of the most object side lens unit; and a movable lens element included in the lens unit, said movable lens element being single lens element, said movable lens element being movable in direction perpendicular to an optical axis, said movable lens having a diffracting optical surface, wherein zooming is performed by varying distance between the plurality of lens units.

24. A zoom lens system as claimed in claim 23, movable lens element satisfies the following conditions:

$$0.005 < \phi d/\phi r < 0.10$$

$$\nu dr > 50$$

where:
$\phi d$: power of the diffracting optical surface;
$\phi r$: composite power of refracting optical surface;
$\nu dr$: Abbe number.

25. A zoom lens system as claimed in claim 23, further including:
another lens element in which a diffracting optical surface is formed on a refracting optical surface, wherein:
in said movable lens element, said refracting optical surface and said diffracting optical surface formed thereon have negative powers and, in said another lens element, said refracting optical surface and said diffracting optical surface formed thereon have positive power.

26. A zoom lens system capable of correcting an image blur resulting from vibration of the optical system, comprising:
a plurality of lens units; and
a movable lens element that is included, in one of the plurality of lens units, and that is movable in a direction perpendicular to an optical axis and that has a diffracting optical surface, said diffracting optical surface having a diffracting optical power to correct chromatic aberrations caused by decentering the lens element, wherein zooming is performed by varying distances between the plurality of lens units.

27. An optical system as claimed in claim 26, wherein said movable lens element is a single lens element.

28. An optical system as claimed in claim 27, wherein said diffracting optical surface is formed on a refracting optical surface of said movable lens element.

29. An optical system as claimed in claim 28, wherein said movable lens element satisfies the following conditions:

$$0.005 < +\phi d/\phi r < 0.10$$

$$\nu dr > 50$$

where
$\phi d$: power of the diffracting optical surface;
$\phi r$: composite power of refracting optical surfaces;
$\nu dr$: Abbe number.

30. An optical system as claimed in claim 28, further including:
another lens element in which a diffracting optical surface is formed on a refracting optical surface, wherein,
in said movable lens element, said refracting optical surface and said diffracting optical surface formed thereon have negative powers and, in said another lens element, said refracting optical surface and said diffracting optical surface formed thereon have positive powers.

31. An optical system as claimed in claim 26, wherein said movable lens element is a plastic lens element.

32. An optical system as claimed in claim 26, wherein said movable lens element has at least one aspherical surface.

* * * * *